March 28, 1961 W. J. PETERSON 2,976,653
SYSTEM OF MERCHANDISING AND EQUIPMENT THEREFOR
Filed Oct. 10, 1955 17 Sheets-Sheet 1

*INVENTOR.*
W. JEROME PETERSON

INVENTOR.
W. JEROME PETERSON
BY
Warren Dunham Foster
Attorney

March 28, 1961 W. J. PETERSON 2,976,653
SYSTEM OF MERCHANDISING AND EQUIPMENT THEREFOR
Filed Oct. 10, 1955 17 Sheets-Sheet 3

INVENTOR.
W. JEROME PETERSON
BY

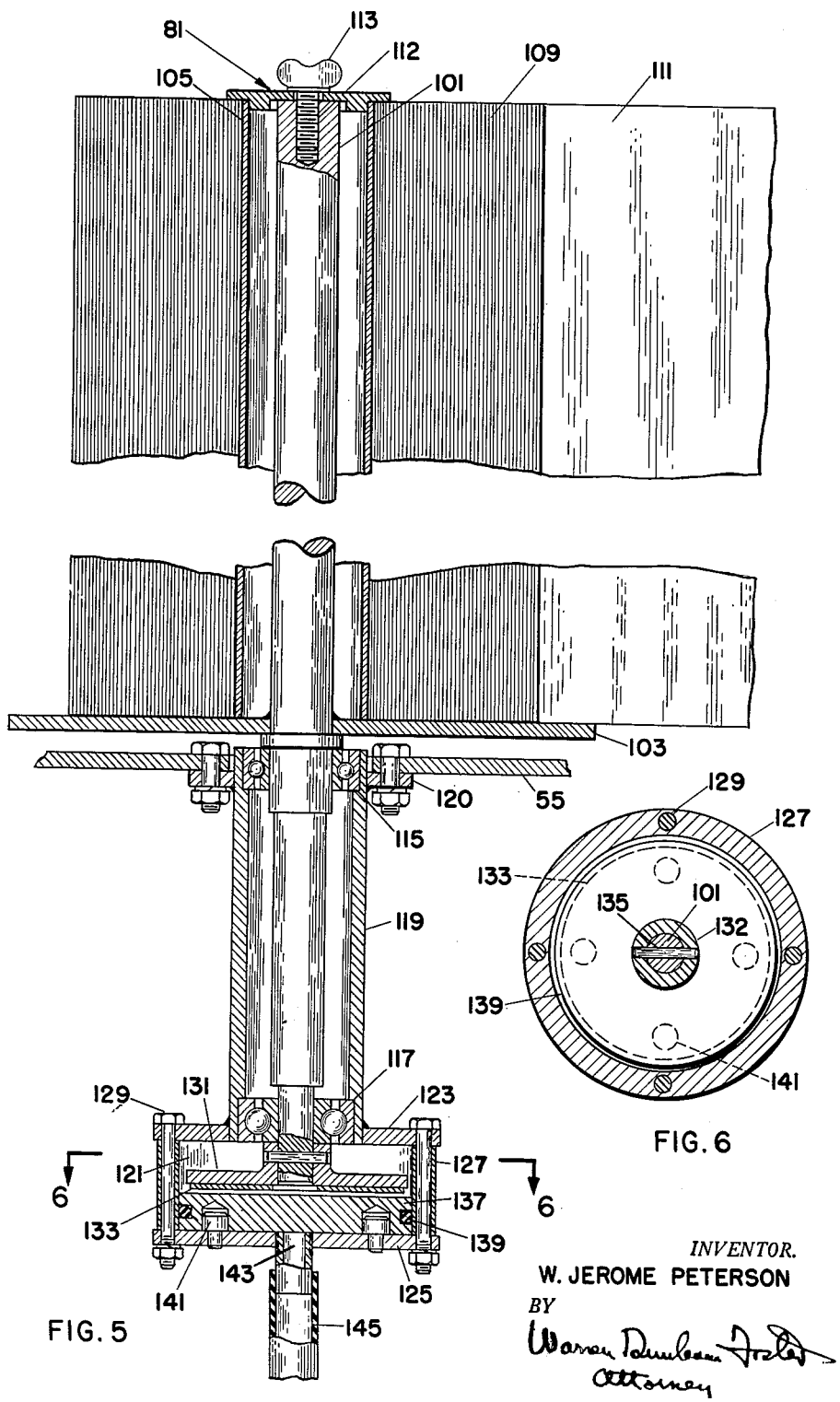

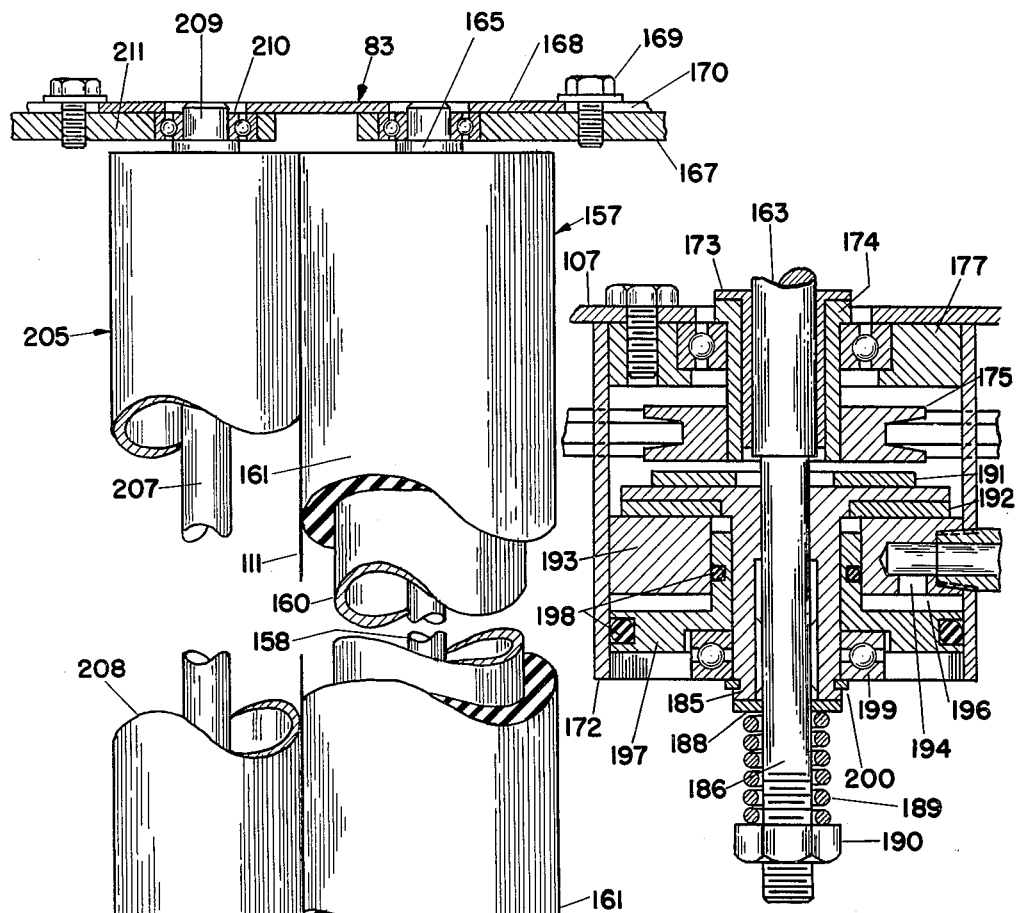
FIG. 8
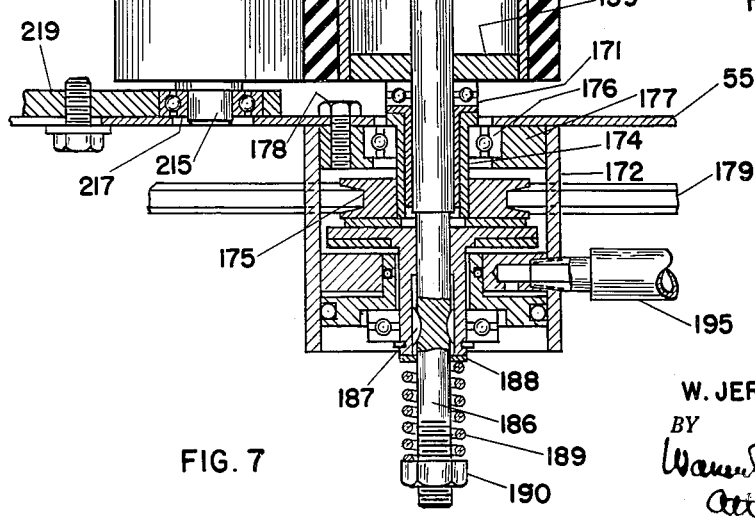
FIG. 7
*INVENTOR.*
W. JEROME PETERSON
BY
*Attorney*

March 28, 1961  W. J. PETERSON  2,976,653
SYSTEM OF MERCHANDISING AND EQUIPMENT THEREFOR
Filed Oct. 10, 1955  17 Sheets-Sheet 7

INVENTOR.
W. JEROME PETERSON
BY
Warren Dunham Foster
Attorney

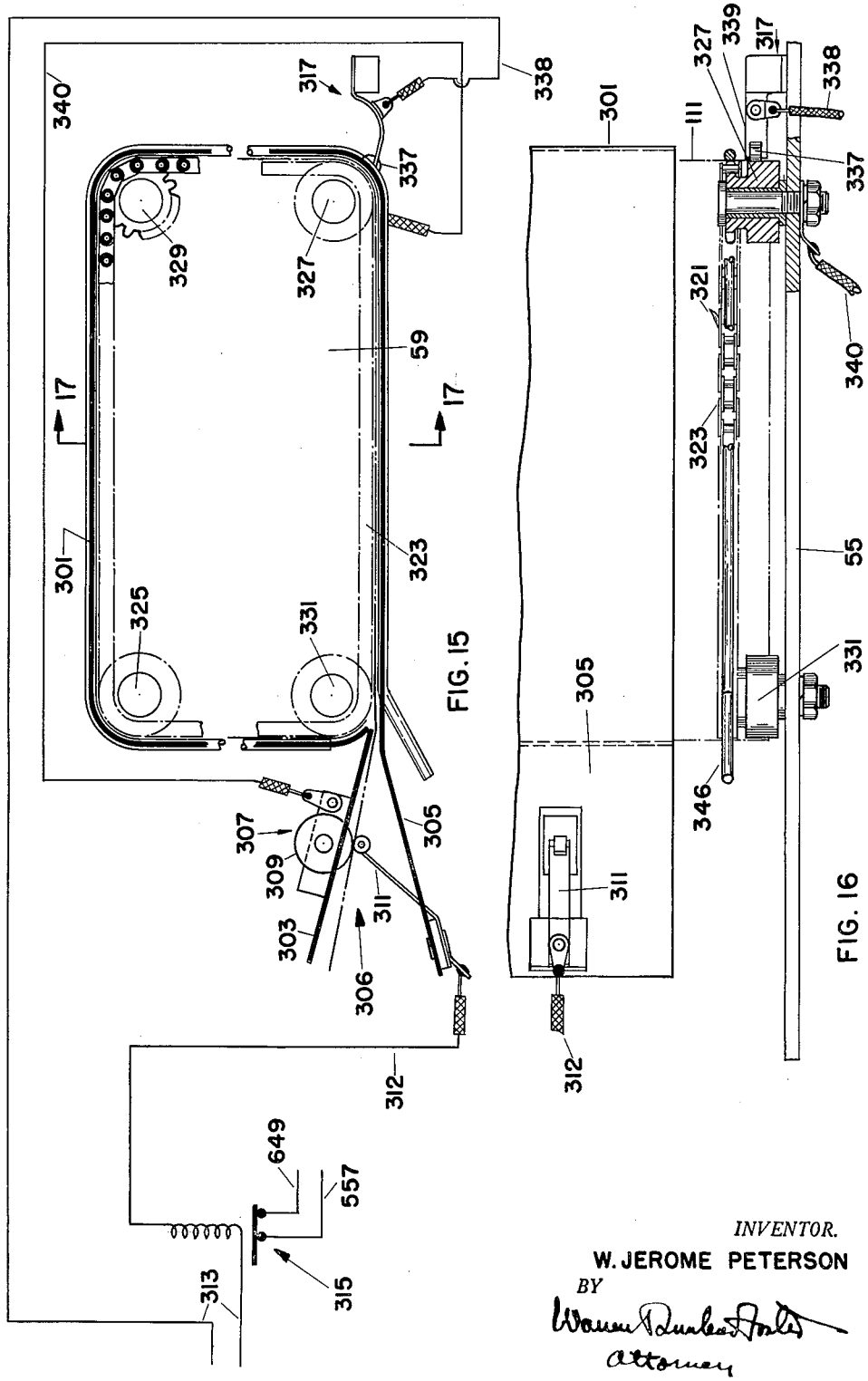

INVENTOR.
W. JEROME PETERSON

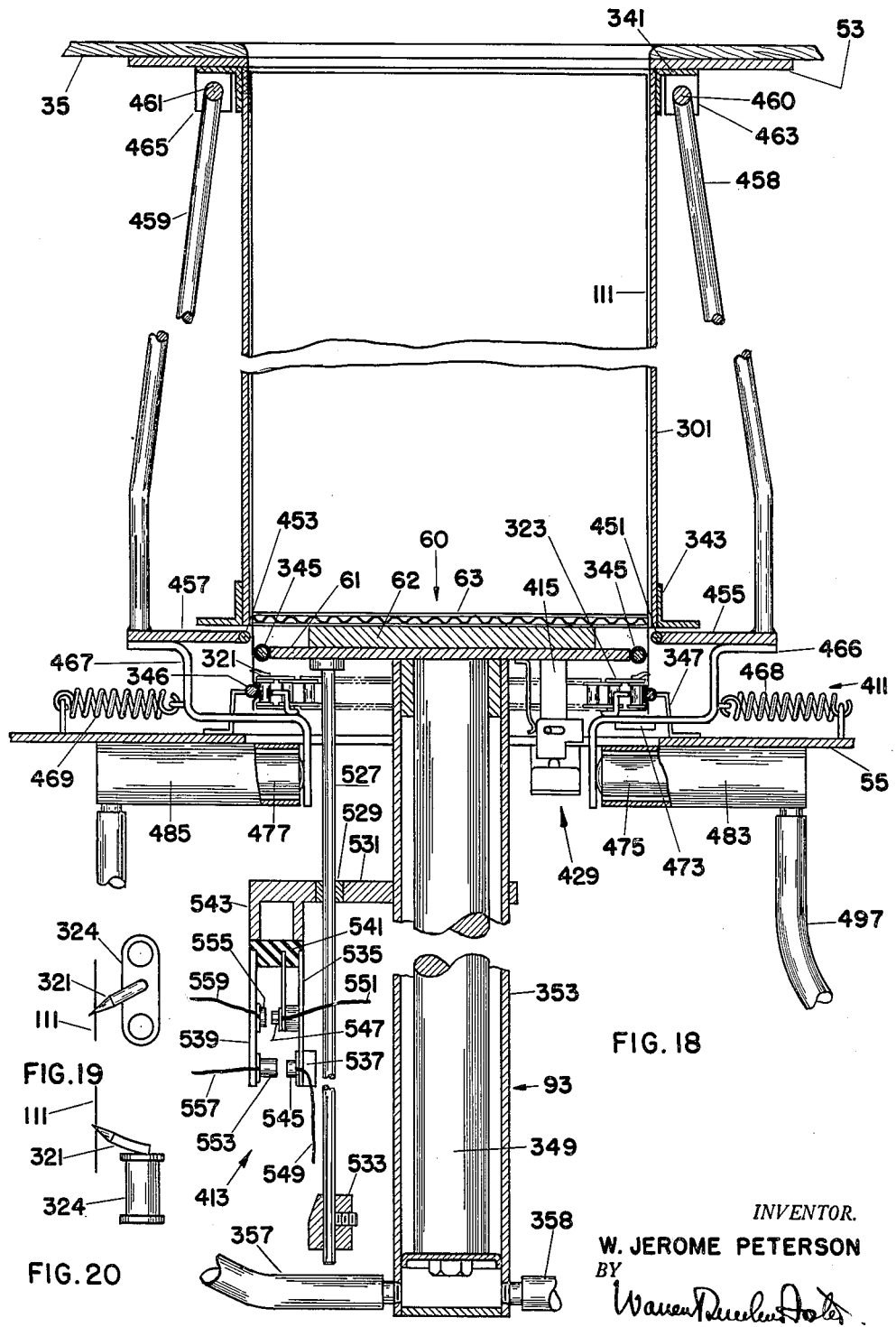

INVENTOR.
W. JEROME PETERSON

March 28, 1961 W. J. PETERSON 2,976,653
SYSTEM OF MERCHANDISING AND EQUIPMENT THEREFOR
Filed Oct. 10, 1955 17 Sheets-Sheet 12

INVENTOR.
W. JEROME PETERSON
BY Warren Dunham Foster
Attorney

March 28, 1961 W. J. PETERSON 2,976,653
SYSTEM OF MERCHANDISING AND EQUIPMENT THEREFOR
Filed Oct. 10, 1955 17 Sheets-Sheet 15
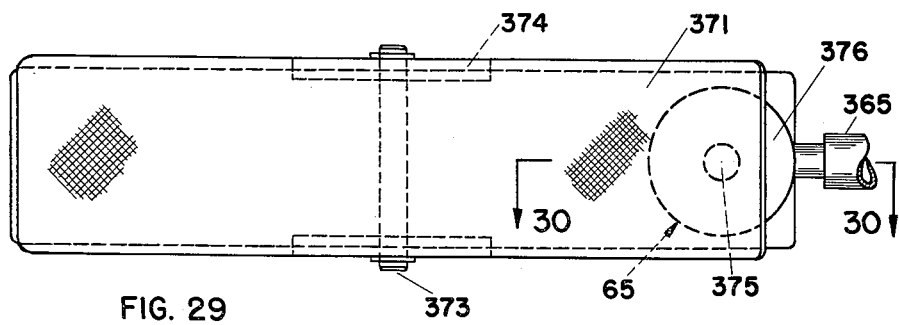
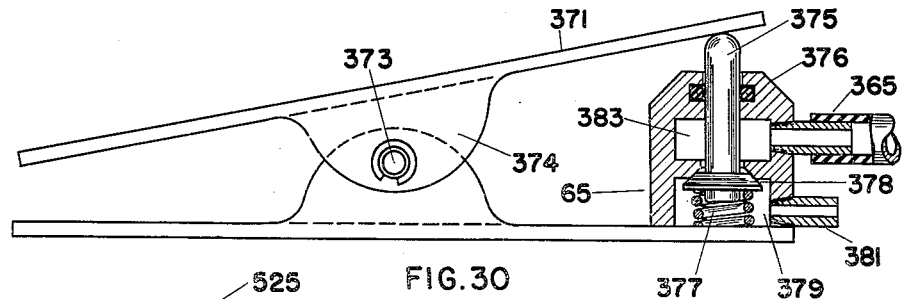
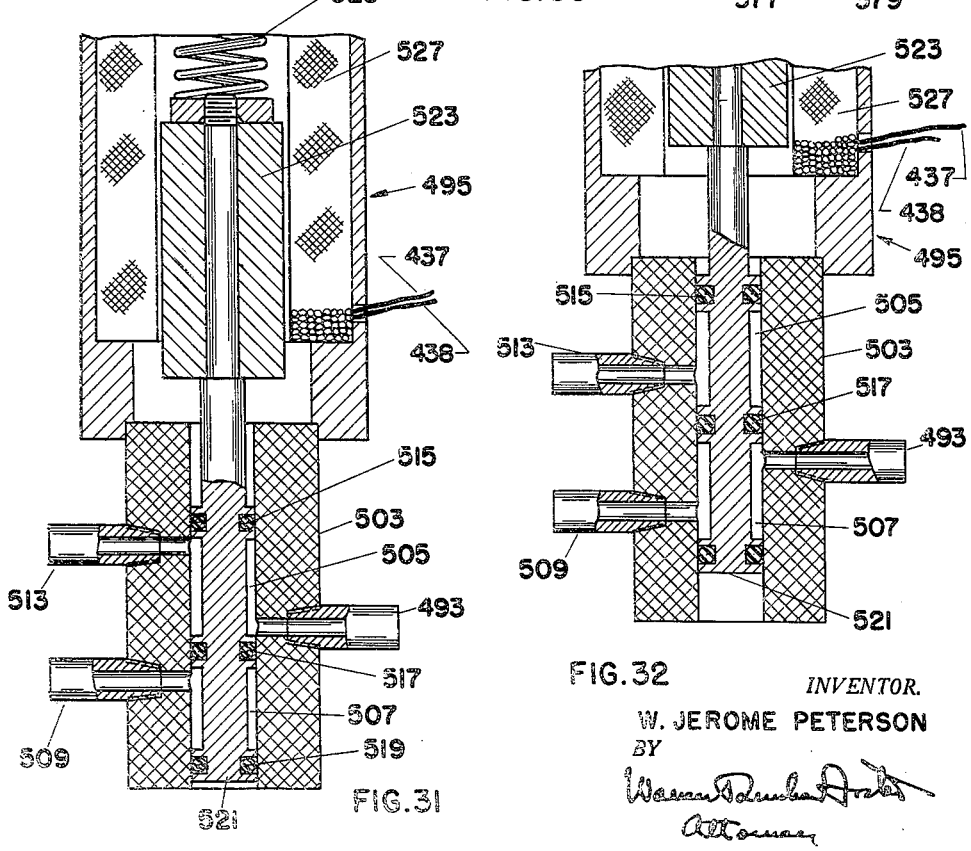
INVENTOR.
W. JEROME PETERSON
BY March 28, 1961 W. J. PETERSON 2,976,653
SYSTEM OF MERCHANDISING AND EQUIPMENT THEREFOR
Filed Oct. 10, 1955 17 Sheets-Sheet 16

INVENTOR.
W. JEROME PETERSON
BY

United States Patent Office 2,976,653
Patented Mar. 28, 1961

2,976,653

SYSTEM OF MERCHANDISING AND EQUIPMENT THEREFOR

W. Jerome Peterson, 16 Wright Road, Wethersfield, Conn.

Filed Oct. 10, 1955, Ser. No. 539,336

29 Claims. (Cl. 53—3)

Modern economic organization demands saving wherever possible in the sale, packaging and distribution of merchandise since costs in almost all types of manufacturing have already been reduced by modern methods of mass and machine production as far as is consistent with the maintenance of the high wages which are essential to general prosperity. A primary object of my invention is to produce corresponding savings at points of sale or otherwise and to multiply the results of the labor of the workers involved, with comparable savings in the time and increase in the goodwill of customers. To this end I have devised a system, novel so far as I know, for assembling, conveying, recording, packing, wrapping and delivering a plurality of articles at a lowered cost and increased efficiency.

A primary object of this invention is to provide such a system which may consist entirely of machine operations under automatic control or a combination of such operations with control which is partly manual and partly automatic, or, if desired, wholly manual. A related object is provision of such a system of great simplicity and requiring no mechanical skill in its operation so that it easily can be used by concerns who are primarily merchants or material-handlers and not manufacturers or others who have skilled labor available. I illustrate my invention as applied at the point of purchase in a retail store, of the type known as a chain store, but it is applicable to many other establishments, retail or wholesale, or manufacturing, or otherwise, wherein it is necessary to assemble, check, pack and deliver goods. While my invention is particularly useful in handling a relatively large number of different or ramdom items which are placed together, it can be applied to single items, of the same or diverse nature, which must be successively handled. I prefer to combine the elements described herein into my entire system, but an important object hereof is to provide novel and efficient individual units for use independently of all or a portion of the remainder thereof.

Careful and extensive time studies in chain stores have shown that by the use of my system the time expended by a worker is cut approximately two-thirds since this one person does the work of two persons in less time than she alone must now spend, with less fatigue and strain and greater efficiency.

In the illustration herein of my invention as applied to a chain store, a purchaser places the articles which she has chosen upon a conveyor situated beside a single worker who acts as a checker, cashier and packager. The conveyor brings the goods past a position, at which this worker identifies each article, sees its price and with her right hand records each successively upon her register, and on to a counter. With her left hand she simultaneously places the items, preferably arranging them by size and weight, upon a stiff sheet which is to become the bottom or base of a container which is formed wholly or largely automatically. This base has been placed on the top of an elevator and slightly below the level of the counter. As articles are placed on the base the elevator descends so that as more articles are placed on the base their top surfaces are substantially level with the counter so that all packing is done at counter level, with no necessity to lift articles and then lower them by hand, as is done with a conventional bag. The travel of this conveyor belt is normally continuous but can be stopped and started by the worker without use of either hand.

When the elevator reaches the bottom of its well, a container or bag is automatically completed about the bottom, with the sides tucked under and fastened to the bottom sheet, and the filled bag and its contents are raised to the level of the counter, where the purchaser picks it up and departs. This entire process requires only a very few seconds. I would prefer that the elevation of the newly formed bag and the contents therewithin take place entirely automatically except for the possibility that customers or their children, in spite of warnings, may place their fingers in the way of the rising elevator with annoyance although not serious injury. Consequently usually I have this raising operation controlled by the worker in a manner which does not require the use of either hand, but my invention is entirely automatic when required.

This entire cycle, as so performed, takes less time than in the usual single conventional operation known as "cashing up." As the bag is being completed and the elevator rises, the operator already has collected from the customer and begins to repeat the cycle for the next customer.

In ordinary chain store procedure the checker, if she attempts to work alone, in addition to "cashing up," arranges the goods on a counter, reaches under a counter or elsewhere to secure a bag, opens it, and then packs the items in the bag. None of these latter operations is required by my procedure. Often a packer, particularly when business is brisk, is assigned to assist the checker. The presence of this second worker, however, does not cut the time of the operation in half because the packing operation generally takes longer than the checking according to conventional methods, as reflected in careful and repeated time checks. In some instances chain stores have assigned two packers to one checker, but because of uneven flow of business and in addition great differences in dollar volume and bulk between successive purchases one of these two packers is likely to be idle much of the time. Elaborate systems have been proposed to make easier and more efficient the work of one or more assistants to the checker but so far as I am aware none in practice has proved economic.

The one operator needed by my system may arrange the purchased goods with the larger or heavier goods first disposed upon this sheet which becomes the bottom of the bag or since I provide abundant strength in the automatically created package they may be placed at random upon the bottom sheet. The elevator which supports this bag-bottom sinks under the control of a foot of the operator or alternatively in proportion to the weight which is applied.

The saving in time and increase in efficiency on the part of employees is matched by corresponding saving in the time of customers and increase in their goodwill. Particularly at rush hours customers are annoyed at having to stand in line for their purchases to be processed. A reduction of two-thirds in such time avoids such annoyance, increases goodwill and gives customers more time to spend in actual purchasing and hence increases sales. The reduction of processing time directly eliminates that portion of floor space and parking area which otherwise the store would be compelled to maintain to cover the time that the customer must wait in line to be checked out and the waste of time caused by the relative slowness of conventional checking out.

A basic object of my invention, therefore, is to carry out, with a minimum of capital and labor cost and a maximum of certainty and efficiency, together with maximum service to customers in minimum time, the above operations or others analogous thereto.

An important object encompassed within this invention is an elevator system, useful for packaging, the control of which is either automatic or manual, if desired responsive to the weight of the goods placed upon an elevator platform, and correlated, entirely automatically or manually, with the formation of a bag about the articles upon the platform. Another important object is provision of a container-making system and devices wherein paper is fed from a roll, severed in lengths necessary for one container, that length wound about a bottom member, the bottom edges of that section of the paper tucked under and fastened to such bottom member, and thereafter the leading end of the paper remaining on the roll advanced and the cycle repeated. Included within these objects is the provision of especially prepared paper and mechanism and methods by which such paper is handled to accomplish these purposes. An important object is the correlation of such packaging with an elevator and the correlation of either or both with the conveying, checking out and control operations or some thereof previously described. Another important object is the provision of such a container-making device independently of an elevator or of the other elements of my system as a whole.

Included within my invention is a control system, illustrated as pneumatic, under the control of an operator for carrying out certain of the operations hereof, either fully or preferably partially automatically, and the provision of an electrical system, again either fully or partially automatic, for carrying out the remainder of the operations, these two control systems being correlated and containing elements by which operations of each are controlled by the other. An important object of this invention is to present such control systems and their components which are high in efficiency, certain in operation and low in cost.

Although I am describing my system as a whole and as applied to a specific use, I am not so limited. An object hereof is to provide a system and mechanism to be applied to any purpose whatsoever to which it is adapted generally allied in principle to that by which the invention is illustrated. A very important object is to provide the sub-assemblies and the sub-operations of the type described for use alone or in combinations other than those described hereby. A related object is to present improved and simplified conveying, elevating, packaging and control methods and devices, novel so far as I know, which are useful in combination and separately, of a simplicity, ruggedness, efficiency and cheapness which, so far as I know, previously have not been realized.

Other objects, advantages and characteristics of this invention will be clear from the above generalized portions of this specification, the detailed description which follows, the subjoined claims and the accompanying drawings. Although I am showing only preferred forms of my invention for purposes of illustration it will be understood that changes can readily be made without departing from the scope of my broader claims or the spirit of my invention.

Figures 5 to 9 both inclusive illustrate the train of supports and rollers by which the paper from which my containers are made is advanced, manipulated and controlled.

Figure 4:
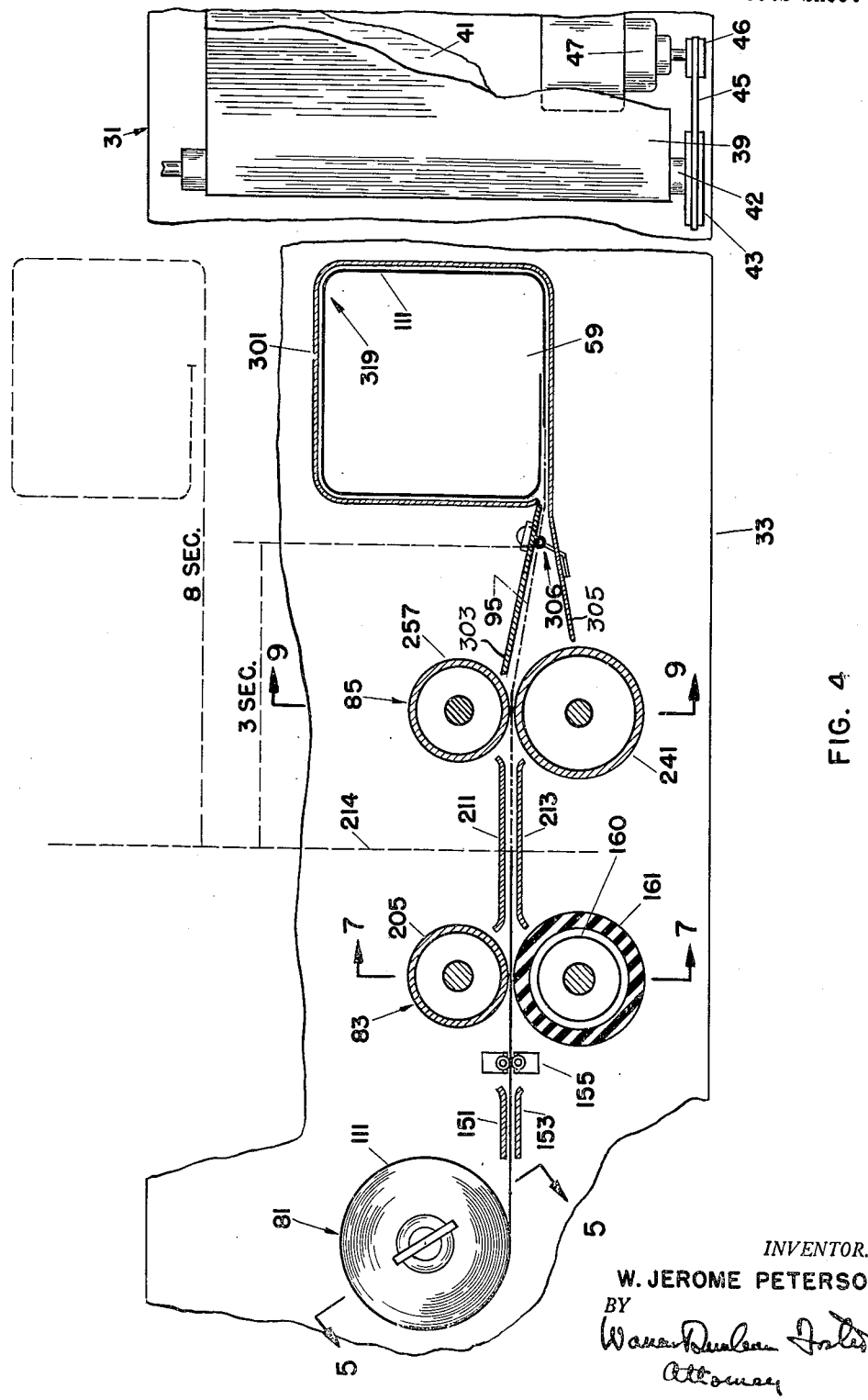
Figure 4 (Sheet three) is a top plan view partly broken away with many parts omitted for clarity showing the path of the paper.

Figure 5 (Sheet four), taken on the line 5—5 of Figure 4, is a view largely in section of a delivery or supply device for paper used to make my containers and of the mechanism which brakes its movement in timed relation to the actuation of associated parts.

Figure 6 is a section taken on the line 6—6 of Figure 5.

Figure 7 (Sheet five) is a view taken on the line 7—7 of Figure 4 partly broken away and partly in section showing a pair of feeding rollers which first engage the paper and control the feeding after it leaves the delivery roll, the parts being shown in feeding position.

Figure 8 is a fragmentary detail corresponding to the lower portion of Figure 7 but showing a clutch and brake of Figure 7 in a non-feeding position.

Figure 9:
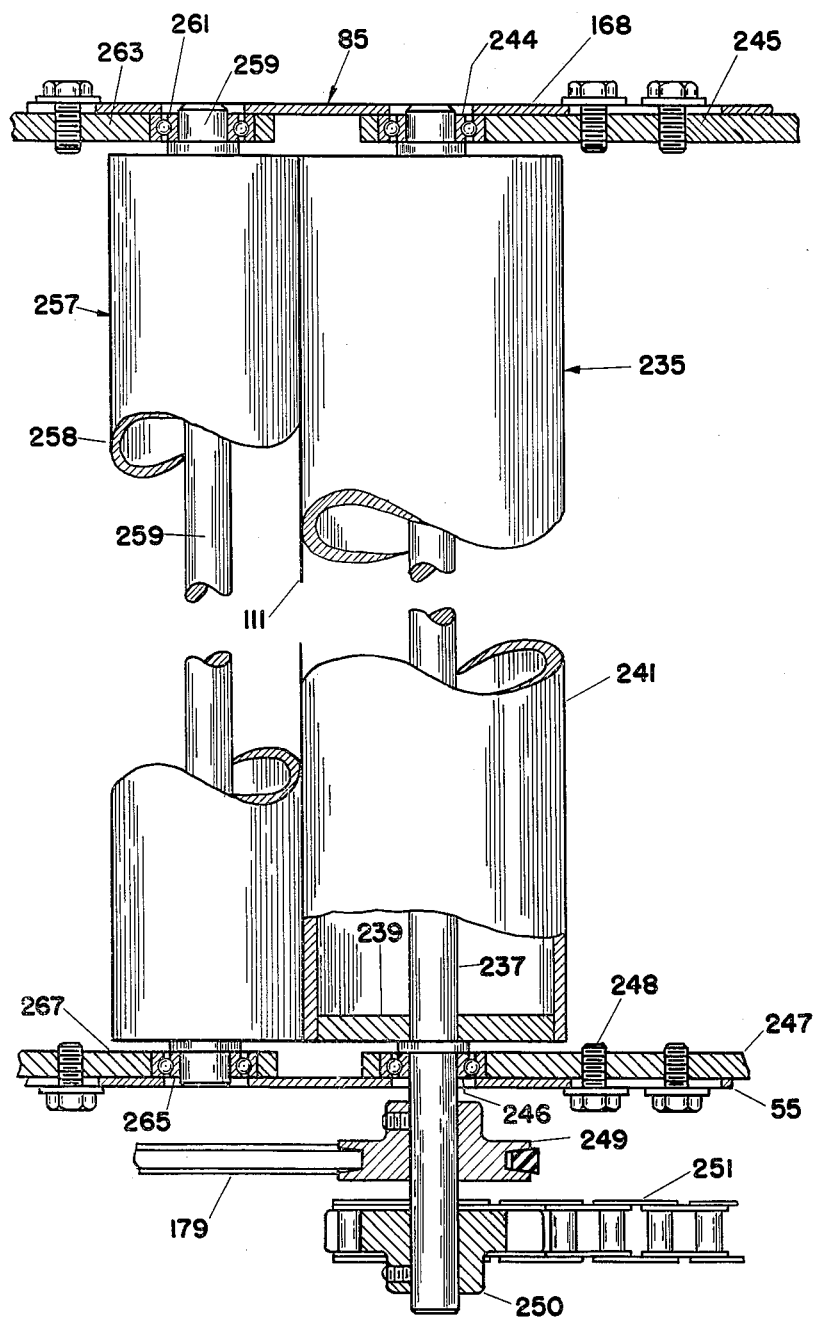

Figure 9 (Sheet six) taken on line 9—9 of Figure 4 shows a second pair of paper feeding rollers adjacent those just previously mentioned.

Figures 10 to 14 (Sheet seven) both inclusive illustrate my especially prepared paper.

Figure 10:
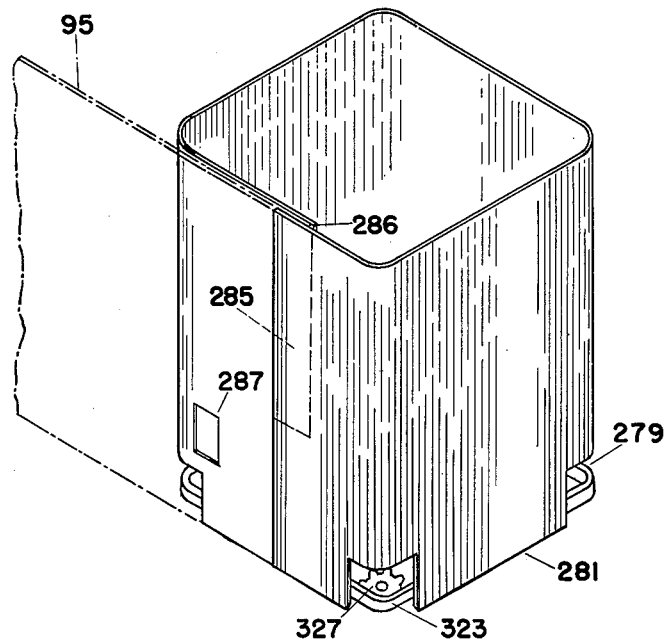

Figure 10 in perspective schematically illustrates paper formed into a wall for one of my containers.

Figure 11:
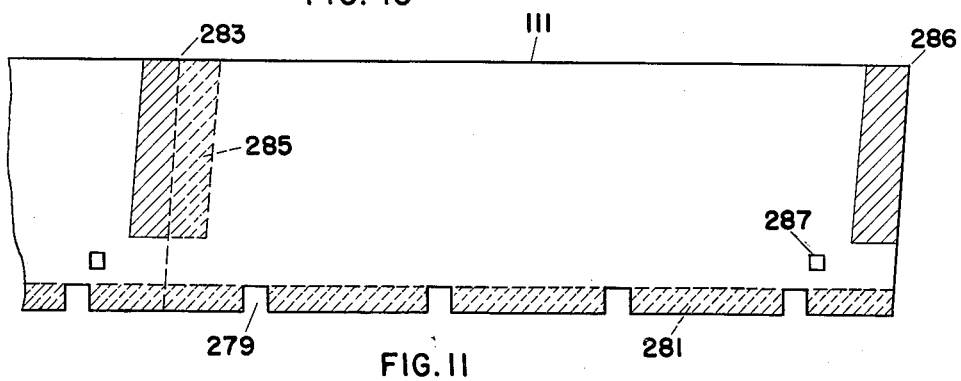

Figure 11 shows a length of such paper before severance.

Figure 12:
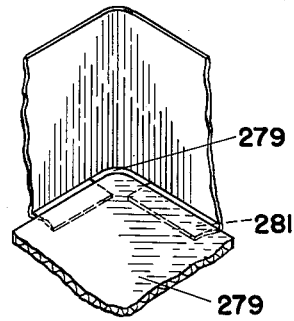

Figure 12 is a fragmentary perspective view showing a mode of forming a corner of my container.

Figure 13:
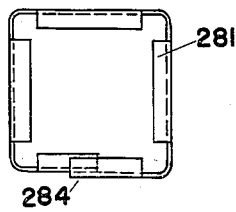

Figure 13 is a bottom plan view illustrating a completed wall of my container before the bottom has been affixed thereto, the bottom supporting flanges having been tucked inwardly.

Figure 14:
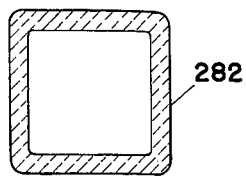

Figure 14 is a top plan view of a base or bottom sheet for a container before the walls have been added.

Figure 15 (Sheet eight) is a top plan view showing my elevator well and devices for controlling the movement of the paper directly associated therewith, the parts being shown in their position after the paper has been put into place ready for the reception of the bottom member of the container.

Figure 16 is a side view partly in section of a portion of the lower part of the structure shown in Figure 15 particularly illustrating a drive for moving the paper about the container and engaging it at the bottom of an elevator well.

Figure 17:
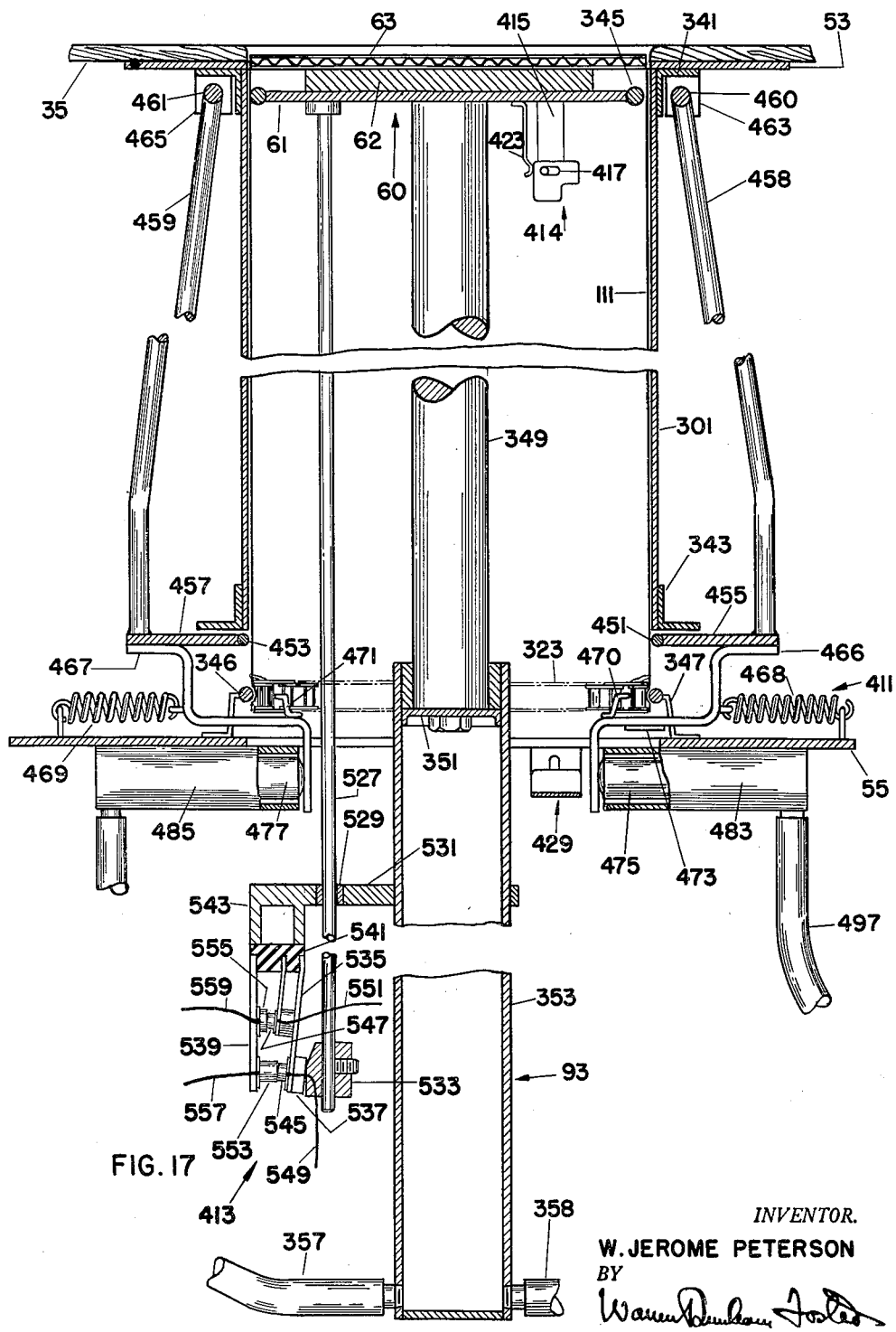

Figure 17 (Sheet nine) is a vertical section, partly broken away, on the line 17—17 of Figure 15 showing my elevator in its upward position ready to receive goods to be packaged.

Figure 18 (Sheet ten) corresponds to Figure 17 but shows my elevator in its lowered position, at the instant before the tucking bars have been moved into operative position.

Figure 19 is a top plan view of one of my paper-moving links.

Figure 20 is a side view corresponding to Figure 19.

Figure 21:
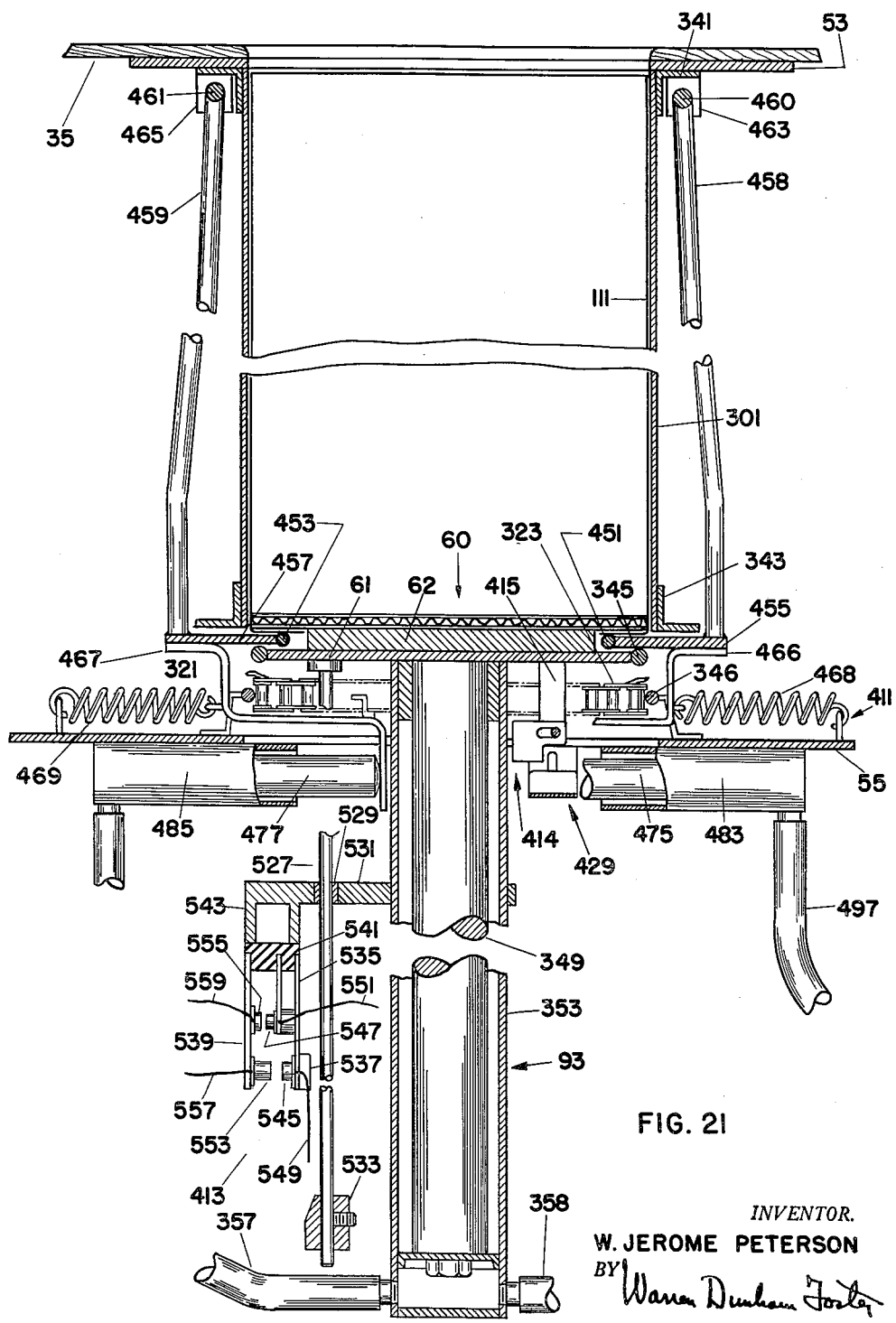

Figure 21 (Sheet eleven) is a view corresponding to Figure 18 showing the elevator in its downward position but after the tucking bars have been operated to force the lower portion of the paper side wall of the container against the bottom thereof.

Figure 22:
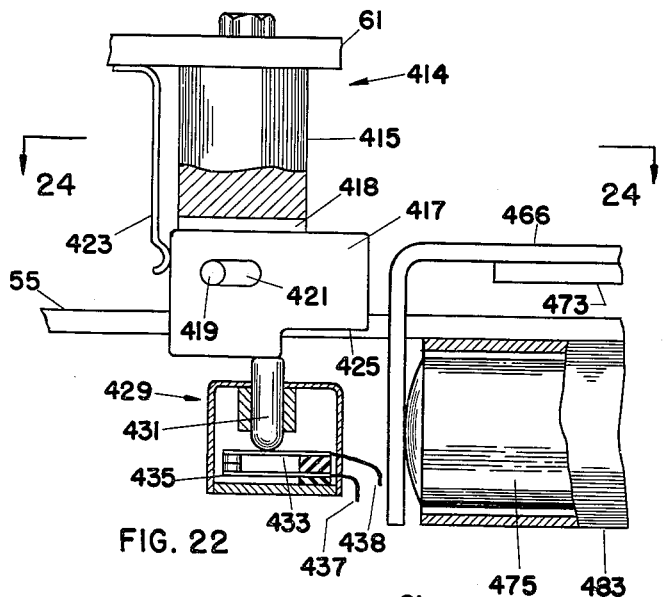

Figure 22 (Sheet twelve) is a fragmentary and enlarged side elevational view partly in section corresponding to a portion of Figure 18 showing a switch and cam which operate the tucking bars, the operating control circuit having been made but the bars not having operated as yet.

Figure 23:
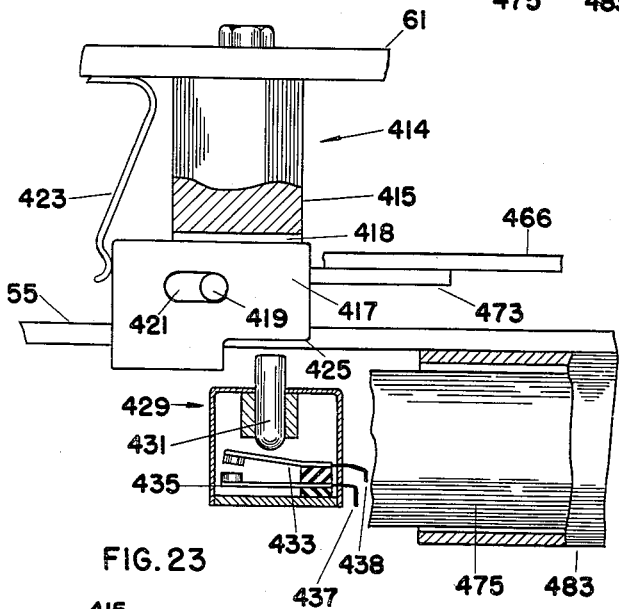

Figure 23 is a fragmentary enlarged view corresponding to a portion of Figure 21 and to a portion of Figure 22 but showing the mechanism after the tucking bars have been operated and the control circuit has been broken.

Figure 24:
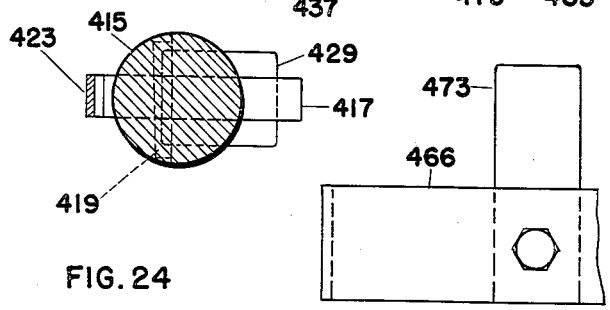

Figure 24 is a partial sectional view taken on the line 24—24 of Figure 22.

Figure 25:
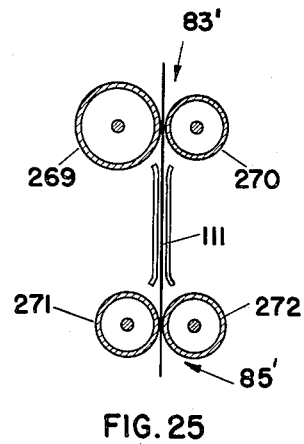
Figure 26:
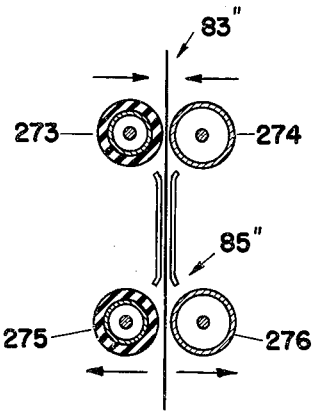

Figures 25 and 26 show diagrammatically arrangements alternative to that of Figures 4, 7, 8 and 9 for building up slack in the paper between the first and second feeding rollers at the line of rupture.

Figure 27:
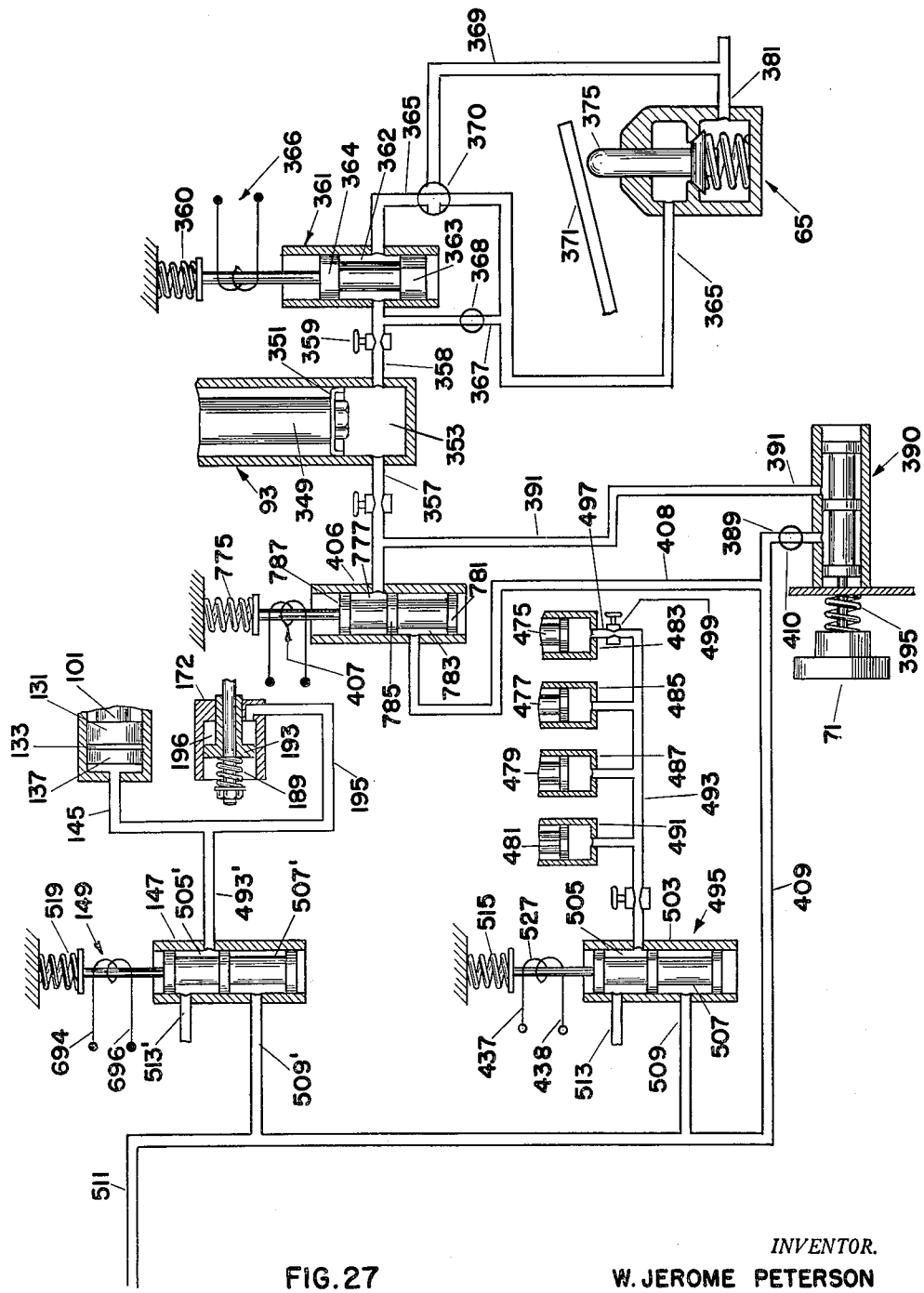

Figure 27 (Sheet thirteen) is a diagrammatic view of the pneumatic portion of my control system.

Figure 28:
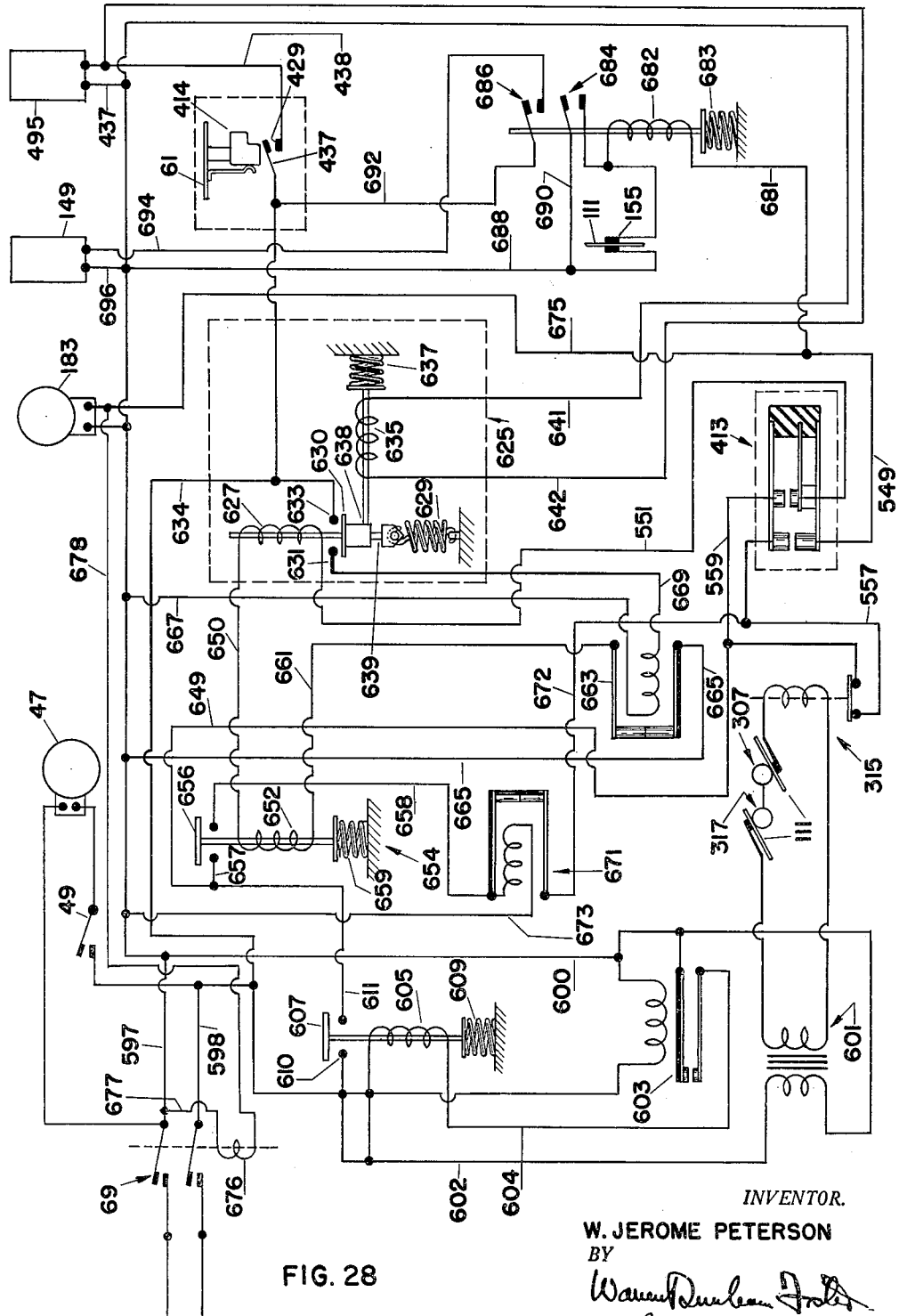

Figure 28 (Sheet fourteen) is a diagrammatic view of the electrical portion of one of my control systems wherein a portion of the operation is manual, notably in connection with the operation of the elevator.

Figures 29 and 30 (Sheet fifteen) show a pneumatic control pedal for the lowering of the elevator.

Figure 29 is a top plan view.

Figure 30 is a side elevation in part in section on the line 30—30 of Figure 29.

Figure 31 is a central section of an electrically controlled pneumatic valve for a tucking cylinder in inoperative position.

Figure 32 corresponds to Figure 31 but with the parts energized.

Figure 33:
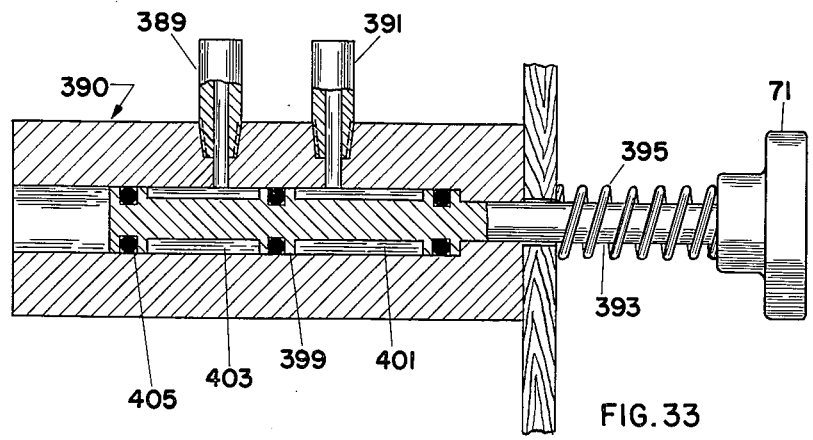

Figure 33 (Sheet sixteen) shows in its inperative position a manually operable pneumatic valve which controls the upward movement of my elevator and certain of the bag forming instrumentalities.

Figure 34:
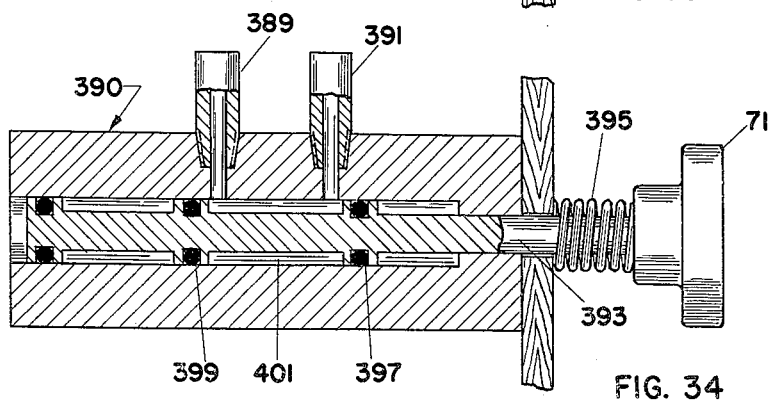

Figure 34 corresponds to Figure 33 but shows the same valve in its operative position.

Figure 35:
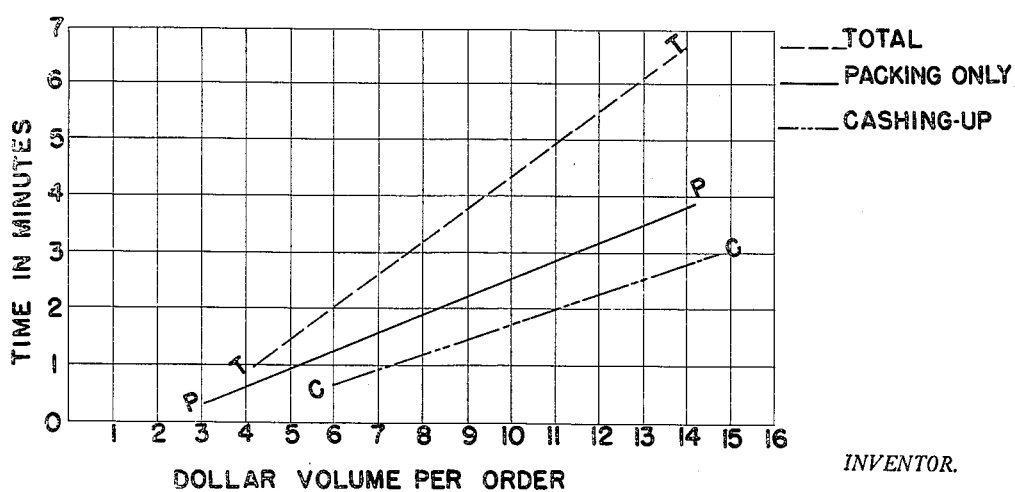

Figure 35 is a graph representing economic studies of operation of my invention.

Figure 36:
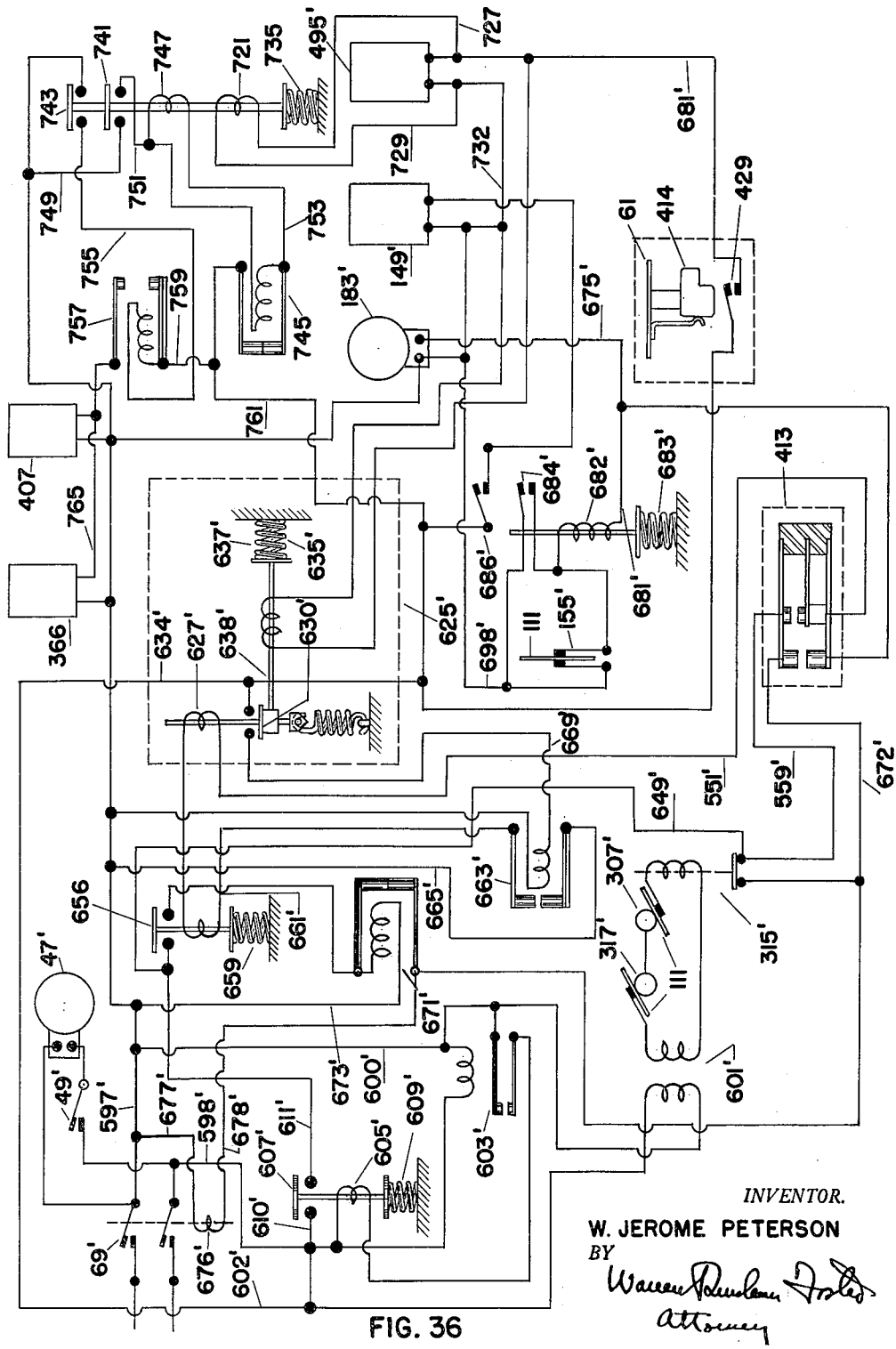

Figure 36 (Sheet seventeen) is a diagram corresponding to Figure 28 but illustrating completely automatic operation.

Figure 1:
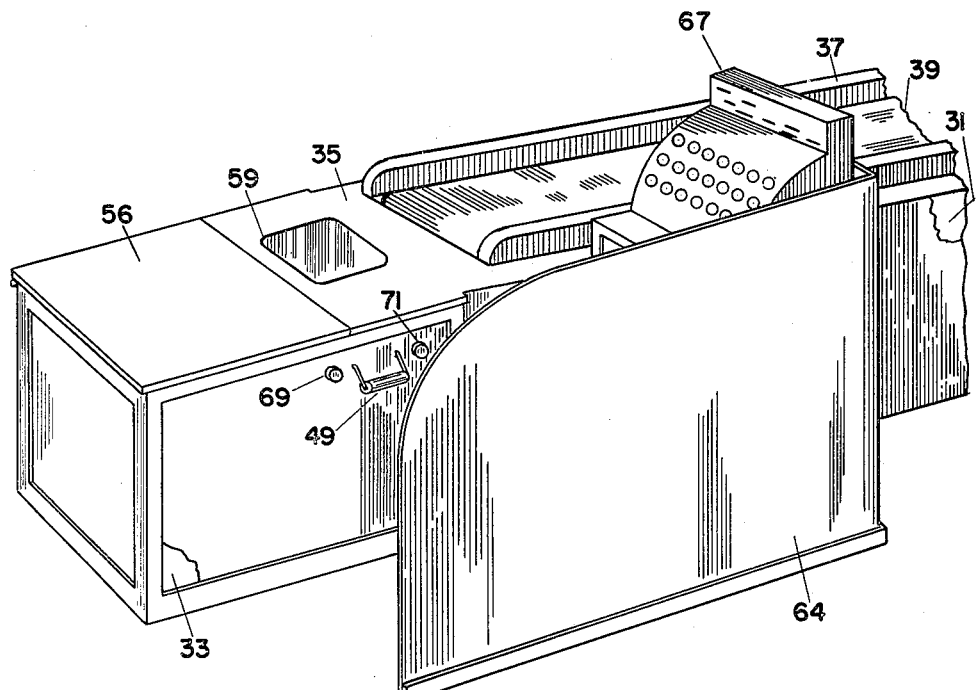
Figure 1 is a perspective view showing the exterior of a device embodying my invention.
Figure 3:
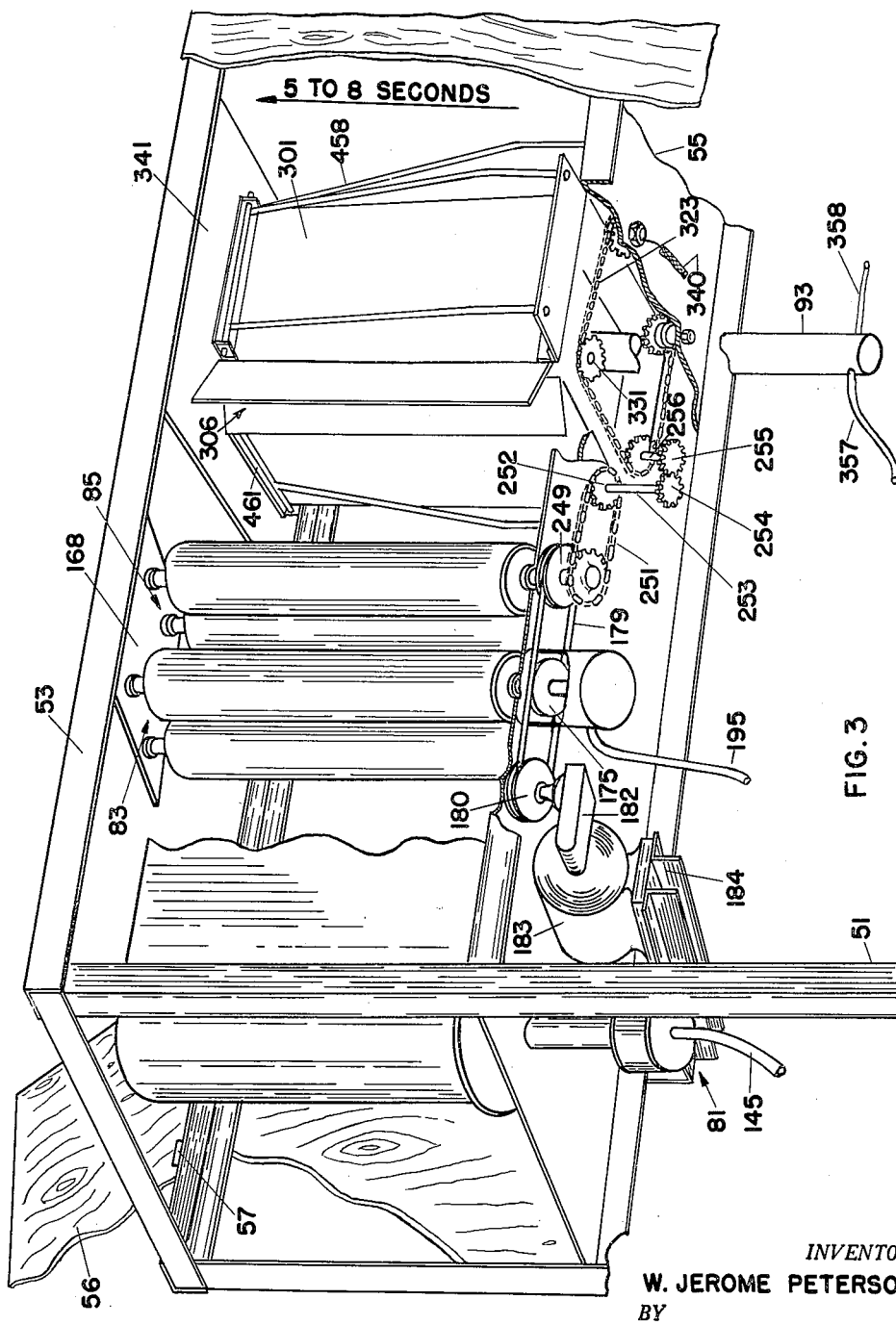
Figure 3 (Sheet two) is a perspective view largely broken away taken from a point below and to the left showing largely schematically the interior of such a device, many parts having been omitted for clarity.

In this specification and the subjoined claims the orientation, except as it applies to spatial relations within the elevator well and of braking, clutching and similar devices, is that of my apparatus disposed as in Figures 1 and 3. Spatial relations within or relating to the elevator well and of the mechanisms associated therewith are expressed from the standpoint of the principal axis of the center of the part involved, "inside" being relatively adjacent that axis and "outside" indicating the contrary. Similar words are used with similar meanings throughout.

I shall first present my construction and mode of operation from the point of view of a checker and a customer, from the time when purchased goods are placed upon the elevator and removed therefrom after a container has been placed about them, together with the structure immediately associated therewith. Thereafter I shall explain the savings from my system. Next I shall describe the units of my device beginning with the roll of paper and proceeding to the creation of the complete bag and the operation of the elevator. As I so proceed, I present each control element as such. Finally I describe my preferred control system as such, wherein the checker, primarily to overcome the carelessness or inquisitiveness of cutsomers, exercises a fairly large measure of discretion, and finally my control system which is entirely automatic. Also I shall explain how manual operation of each unit if desired can be substituted for automatic.

Figure 2:
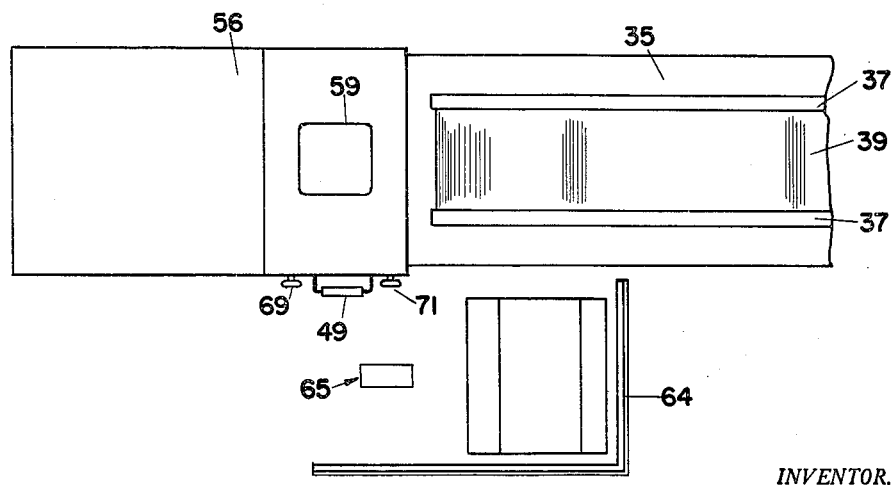
Figure 2 is a top plan view corresponding to Figure 1.

The portion of my invention as illustrated which is seen by an operator and customers is clear from Figures 1 and 2.

A housing is divided into a conveyor chamber generally indicated as 31 and an elevating and bag forming or operating chamber generally indicated as 33. A counter or top flat surface generally indicated as 35 is disposed at the top of the conveyor chamber and extends leftwardly as viewed in Figures 1 and 2. Between vertical rails 37 a conveyor belt 39 substantially in the same horizontal plane as the counter is supported by a plate 41 and runs between an idler not shown and a driving roller 42 (see Figure 4). This driver, by a pulley 43 through a belt 45, is operated by a pulley 46 connected to a motor 47 which is controlled by a switch 49 at the side of the conveyor and counter which is so disposed that it can be operated by the left thigh of the checker as she stands or sits before the register.

Basic framework for my device, as seen best in Figure 3, includes a plurality of vertical struts 51, shown as angle irons, which support horizontal cross angle iron supports 53, of which three only are shown, and a central horizontal supporting plate 55. A flat rigid sheet 56, in practice of plywood, hinged at 57, completes the counter, access being given to the operating chamber when this portion of the counter is raised as shown in Figure 3. In line with the conveyor is an elevator well 59 disposed in the immovable portion of the counter. My elevator, generally indicated as 60 and later described particularly in connection with Figures 17, 18 and 21, includes a platform 61 carrying a central spacer plate 62 on which bottom pieces 63, preferably of corrugated cardboard, for containers to be formed are successively disposed.

A single worker stands or sits behind a screen 64 with a pneumatic valve generally indicated at 65, shown in detail in Figures 29 and 30, easily accessible to her foot, to control the descent of the elevator. In front of her and between the shield and the housing is a cash register 67.

The portions of the device operative within chamber 33 will be described after I present, with the aid of Figure 35 (Sheet fourteen), results of many studies which I have made of the economics of the operation of my system.

In management studies of a chain store, if one worker does both the pricing, checking, cashiering and packing, it is customary to divid her activities into "cashing up" time and "packing" time, the latter term including only what its name implies and the former representing all else. Often in chain stores, two or more persons are provided for each checking point, one called a cashier or checker and the other a packer. According to my system, as reflected in this graph, one person more easily and efficiently performs the work of both, thus more than doubling her capacity and because of the added efficiency made possible hereby accomplishing both results with a minimum of fatigue and strain.

To carry out my mode of operation a customer places her purchases on the belt 39. The entire device first has been rendered operable by operation of master switch 69. By the use of motor switch 49 operated by the left thigh of the one worker the conveyor belt is started and stopped as conditions demand. As the items purchased pass at her left side on the belt the worker records them upon the register and, as they are being or have been delivered to the counter 35, begins their arrangement, entirely with the left hand while the right is engaged in the "cashing up" operation. Then she places the goods upon a container base 63 which rests upon the top of the elevator. The elevator by means later described begins to sink, the rate of descent in the form of my invention first presented being governed by the foot valve 65. During this time the worker is engaged in completing the "cashing up" operation.

It should be noted that my system calls for the simultaneous and effective use of both hand of the checker. Similarly to a touch typist, she does not look at the keys which she strikes with the fingers of her right hand while her eyes and left hand are efficiently employed in determining prices and arranging packages.

The side walls of paper have already been formed about the embryo container, as later described. When the elevator reaches the bottom of the well the container is automatically completed and either entirely automatically or under the control of the worker the elevator with the filled container upon it rises to the top of the well. In the form of my invention wherein the worker causes the elevator to rise she operates an hydraulic valve generally indicated as 71. Then the customer removes the filled container and leaves. While the latter part of this operation has been going on the customer next in line has already placed her purchases upon the conveyor belt and the worker in the manner just described begins the next operation and has the goods at least partially cashed up and partially or wholly arranged for packing by the time the container for the preceding purchaser has been elevated so that the first customer can remove it preparatory to leaving.

The economics of my invention will be well understood by the preceding discussion and a consideration of Figure 35. This graph represents time studies made over a relatively long period in stores sufficiently numerous and diverse to be typical. The captions and lining make this figure self-explanatory. The mean time of "cashing up" in dash-dot line C—C and of packing only in full line P—P and the total time T—T shown in minutes and quarter minutes is plotted against grocery dollar volume per single sale. In all transactions at a volume of from three to fourteen dollars perorder the "cashing up" time is materially less than the packing time only and the "cashing up" time is about one third of the total time. Extensive studies of my system have proved that the total time which is required thereby is approximately the same as the present "cashing up" time. Therefore under my system the entire operation generally saves approximately two-thirds. One reason for this economy is that the worker need not reach under a counter, take out a bag, and open it up—to say nothing of carefully fitting the items into it. This is one of the great advantages of making the container concomitantly with the "cashing up" operation and automatically forming it about the goods. Extensive studies have shown that a container of a standard size, which by test I have found most efficient for the purposes of my system, accommodates a large percentage of all orders in a chain store. When one container is not sufficient I merely provide a plurality, filling one after another as needed.

A container design, which my tests have proved efficient and is at present in use, has a capacity of 1600 cubic inches. Its base has 100 square inches (10 x 10 inches) and the height of each wall is 16 inches. The mouth is sufficiently large so that the one worker required by my system can pack the bag quickly and easily. Such a container can be carried by a housewife, even though relatively short, without interference with her vision. Containers of the same capacity with a base 6 x 10 inches and a height of 27 inches are so high that even a tall person has difficulty in seeing over them. A compromise between the two but less efficient has a base area of 80 square inches (8 x 10 inches) and a height of 20 inches. In either of the latter two cases, particularly that with the height of 27 inches, the strain upon the side walls is very much greater. If I employ a corrugated bottom member of fair weight and tensile strength with walls of a height of say 16 inches I am able to use comparatively light weight paper with minimum danger of tearing. Alternatively to my present container a square package 11 x 11 x 11 inches, with a capacity of 1331 cubic inches is highly desirable. I mention these dimensions merely as illustrative of the best manner which I have yet found to carry out this aspect of my invention, but I am not dependent upon any particular sizes or shapes.

Even though I require a specially prepared paper and a bottom of greater weight than that of an ordinary bag, all as elsewhere described, I have found that the total material cost for packaging is less than that of ready made bags. The slight capital and depreciation charges of my bag making equipment of course is more than offset by saving in time and efficiency of operation.

Having described what might be termed the publicly viewed portion of my system I shall explain how I make my containers and the construction and operation of my elevator, element by element, and thereafter the over-all controls. For clarity in presentation, I can conveniently consider these elements to be my supply or delivery or storage roll 81, first pair of feed rollers 83, second pair of feed rollers 85, paper driving mechanism 89, tucking mechanism 91, and the devices 93 for raising and lowering the elevator 60. The entire path 95 through which the paper is advanced is clearly seen in Figure 4. The paper, however, never occupies all of this path at one time. Each of these reference characters is applied generally to a unit or sub-assembly.

Paper is advanced from delivery roll 81 by the first pair of feeding rollers through a guiding channel in which the right amount of slack is accumulated and advanced by the second pair of rollers to form a tube or side wall about the bottom 63 of a container in process of formation. When enough paper has been advanced that length is automatically severed from the remainder and so directed as to form the vertical wall of a new container.

After the paper is directed about the interior of the elevator well and the elevator descends, the lower edges of the paper are automatically attached to the bottom sheet, which previously has been placed upon the elevator. After this container is completed it is raised and then automatically sufficient paper for a wall of another container is advanced, the portion which has been severed forming its leading end and being again directed about the elevator well. Severence follows the sudden stoppage of both the paper supply and the first pair of feeding rollers while the second pair continues to operate.

The construction of my delivery support for the paper or paper storage roll and the automatic brake therefor generally indicated as 81 is shown in Figures 5 and 6.

A shaft 101 rigidly supports a lower reel side 103. A hollow cylinder 105 is placed upon this reel side and within a roll 109 of an especially prepared paper 111 which will be described in connection with the figures shown upon Sheet seven hereof. A collar 112 held in place by a thumb screw 113 is disposed at the top of cylinder 105 after the roll has been positioned.

This entire structure is carried by horizontal rigid support plate 55. The shaft 101 revolves in an upper bearing 115 and a lower bearing 117 between which a cylinder 119 extends, this cylinder as by a plate 120 being mounted rigidly with support 55. A cylindrical pneumatic braking control chamber 121 is rigidly attached at the lower end of this tube 119 below the lower bearing. It includes an upper shoulder or wall 123 horizontal and at right angles to the wall of cylinder 119, a lower wall 125 and an outer wall 127 through which bolts 129 pass to join walls 123 and 125. A generally flat brake disc 131 with a lower braking surface 133 as by a pin 135 is attached to shaft 101 for revolution therewith. Likewise within this chamber is a lower brake operating member 137 in the form of a flat disc, with air-retaining peripheral O ring seals 139 to prevent escape of air. This brake operator is guided for vertical movement by pins 141 fixed to plate 125. An opening 143 admits control-air from a tube or hose 145.

Hose 145, a part of my pneumatic control, as shown schematically in Figure 27, is operated by a pneumatic brake-applying valve generally indicated as 147 operated by a solenoid generally indicated as 149, as is more fully described in connection with that figure. Admission of air under pressure to the under side of brake operating plate 137 forces it against braking surface 133 and instantly stops the rotation of the paper simultaneously with the stoppage of feed rollers 83, as about to be described.

The path 95 of the paper is shown in Figure 4. From the storage roll 81 the paper passes between guide plates 151 and 153 and between members of a spring pressed switch 155 to the first set of paper propelling rollers generally indicated as 83 and shown in detail in Figures 7 and 8 and thence to a second set of feeding rollers generally indicated as 85 shown in Figure 9. In connection with the severance of the paper it is important that slack be built up between these two pairs of rollers, as later explained.

The driver of these two rollers, that to the right as seen in Figure 7, generally indicated as 157, consists of a central shaft 158 attached by discs 159, of which only the lower is shown, to a rigid hollow cylinder 160 which has moulded or otherwise affixed thereto a resilient covering 161, this arrangement being of great importance as will later be apparent. A reduced upper portion 165 of this central shaft is journalled in a block 167 attached to an upper mounting plate 168 as by bolts 169 passing through elongated slots 170 therein. Mounting plate 168 is rigidly supported by one of the horizontal struts 53 (Figure 3).

At its lower end shaft 158 is revoluble within a bearing 171 disposed at the top of a control housing 172 which is attached to plate 55 therebelow. This shaft passes through and beyond that housing through a long inner depending bearing sleeve 173, with an upper shoulder disposed below bearing 171, which is revoluble within an outer bearing sleeve 174. A pulley 175 is rigidly attached to and rotatable with this outer sleeve 174. Sleeve 174 revolves in bearing 176 which is disposed in an annular opening in block 177 and thus fixed against vertical movement. This block as by screws, of which 178 is shown, is rigid with central supporting plate 55. Belt 179 drives this pulley and in turn is driven by a pulley 180 which by a conventional transmission indicated as 182 is operated by a paper feeding motor 183, set upon a bracket 184 attached, in a manner not shown, below plate 55 (see Figure 3). This belt also drives the other pair of rollers 85 and the instrumentalities which advance the paper into and about the well of the elevator to form the side of the container.

Devices to clutch and declutch the pulley to the shaft 158 and apply braking force to the shaft when de-clutched immediately to stop transport of the paper are also disposed in this operating housing below the elements just described. This operation is simultaneous with the stoppage of the supply roll 81 and causes rupture of the paper. A T-shaped main clutching and braking member 185 encircles a lower reduced portion 186 of shaft 158. The leg of the T is splined as at 187 for vertical movement free of the shaft and rotational movement therewith. The bottom of the leg rests upon an annulus 188 surrounding the reduced portion of the shaft and against which bears the upper end of a compression spring 189 the lower end of which is held in place as by a nut 190 threaded to the lower end of the shaft. Thus this spring normally forces the T upwardly toward the lower face of freely revoluble pulley 175.

The upper surface of the cross-bar of the T carries a braking disc 191 and its lower side a braking disc 192. Immediately below this lower braking surface is a pneumatic control block 193, annular in form and rigid with control housing 172. An inlet 194 therein is attached to a hose 195 which leads to control valve 147 (Figure 27). This air passage 194 feeds a pneumatic operating chamber 196, the upper surface of which is formed by the lower side of control block 193 and lower and inward walls of which are formed by the base and leg respectively of a generally L-shaped pneumatic control member 197. Suitable insulation against air leakage is provided by O rings 198 bearing against the inner surface of housing 172, which forms the outer wall of the chamber, and the outer surface of control block 193, respectively. A bearing 199 and an annulus 200 permit relative rotational movement between the pneumatic operating member 197 and the main T-control member 185 but enforce joint vertical movement.

By reason of this construction when air under pressure through hose 195 and opening 194 is introduced into control chamber 196 the operating control member 197 is forced downwardly from the position of Figure 7 to that of Figure 8. Thereupon the clutching surface 191 is removed from contact with the lower face of pulley 175 which will thereupon revolve idly. Simultaneously the braking surface 192 on the lower surface on the crossbar of the T of the main control member immediately makes contact with the upper surface of fixed pneumatic block 193, thereby stopping at once the movement of shaft 158 and roller 157 and the paper in engagement therewith. On the contrary when this pressure is exhausted, by means which later will be described, the parts are moved by spring 189 to the paper advancing position of Figure 7. The brake is disabled and clutch disc 191 brought into contact with the lower side of pulley 175 thereby through the spline 187 again connecting it to the roller 157 and advancing the paper.

When the parts are in the position of Figure 8 the paper has been advanced to and about my elevator well wherein containers are formed and with a side wall completed, as is shown in Figure 4. When the paper is first inserted it must be threaded past first feed rollers 83 and with its leading end not so far advanced that a signal for the severance of the paper will be given prematurely. After leaving the feeding rollers 83, the paper passes between guides 211–213 past a break point 214 and to second feed rollers generally indicated as 85. If the leading end is initially disposed at or about the break point 214 (later discussed) it will be in proper position. Construction and operation of these paired rollers will be readily understood from the immediately preceding portion hereof describing rollers 83 and Figure 9.

A roller of relatively large diameter generally indicated as 235 is built up about an inner shaft 237 which as by upper and lower annuli, of which only the lower 239 is shown, supports a hard cylindrical paper-driving surface 241. The upper portion of shaft 237 is revoluble in a bearing 244 in a block 245 depending from top support plate 168. This block is adjustable as previously described to space the rollers of this pair in desired relation to each other. Shaft 237 extends downwardly through a bearing 246 in a block 247 attached as by bolts 248 to central support plate 55 and adjustable as previously described.

A pulley 249 is locked to shaft 237 and is driven by belt 179. Also locked to shaft 237 is a sprocket 250 which drives a sprocket chain 251 which drives sprocket 252 which through shaft 253 revolves gear 254 meshing with gear 255 attached to shaft 256 which furnishes the drive for advancing the paper about the wall of the elevator well to form in situ the wall of each container, as later described in connection with Figures 15 to 21 both inclusive.

An idler roller generally indicated as 257, parallel to and adjacent driven roller 235, just described, and of less circumference, with an unyielding exterior surface 258, formed about a central shaft 259 as previously described, cooperates with the driven roller to advance the paper, in a special manner which will later become clear, see Figure 9. The top of this central shaft 259 is journalled at 261 in a block 263 shown as adjustably bolted to upper plate 168. The lower end of this central shaft is journalled at 265 in a block 267 bolted to main frame plate 55 for horizontal adjustment.

For the best operation of my invention it is important to build up slack between the paired rollers 83 and 85 at the line of rupture 214 between the guides 211 and 213. A simple and efficient construction to accomplish this end is to make the rates of revolution of the driving rollers 157 and 235 of each pair and their diameters the same and despite such construction slightly to increase the speed of the paper 111 as it is being advanced by the first pair than by the second pair. My preferred construction for this important object of my invention is shown in Figures 7, 8 and 9, and I shall later describe two alternative and satisfactory arrangements, which I illustrate in Figures 25 and 26.

In many operations which feed thread, yarn, and material in filament or in film or sheet form in a moving section of which it is necessary to secure slack or tension any one of the following three arrangements may be effectively and cheaply utilized.

In the first such form, illustrated as a part of this entire combination, the resilient surface or layer 161 of the first driving roller 157 increases the speed of the paper by damming up, as it were, a portion of the resilient covering just before it passes its line of contact with the unyielding surface 208 of the idling roller 205. Thus as the paper passes through the first set of rollers this dammed up portion as it actually passes the unyielding surface of the idler roller moves faster and increases the effective peripheral speed of the first rollers and hence the translational speed of the paper. The diameter of the second roller 235 being the same as that of 157 but its surface being unyielding the peripheral speed of the paper as it is advanced by the second pair and leaves the channel formed by guides 211 and 213 is less than that when it enters, with consequent production of slack. Therefore at the sudden stoppage of revolution of supply roller 81 and the first pair of paper-advancing rollers 83 and continuing movement of the paper beyond this point, it is easily ruptured in its slack section at the proper rupture line, aided by the scoring or perforations 283 later described.

Another means of accomplishing this end is shown diagrammatically in Figure 25 upon Sheet twelve and described at greater length in said co-pending application. In this second embodiment I provide a first pair of paper advancing rollers 83' and a second pair 85'. The paper 111 passes between powered roller 269 of the first pair and an idling roller 270 and also between a powered roller 271 of the second pair and an idling roller 272. The first powered member 269 is of larger diameter than the second powered member 271 and therefore increases the peripheral speed of the paper. The surfaces of all rollers are unyielding.

Still another and preferred construction and mode of operation which I have found practical to accomplish this end is shown in Figure 26. As an economical manufacturing operation often it is cheaper to form the corresponding paper-engaging rollers of each pair in identically the same manner and to change the peripheral speed at the point of entrance and exit of the guiding channel by making the pressure between the first paired rollers greater than that between the second paired rollers. As seen in Figure 26 the paper passes between a powered roller 273 of the first pair 83'' and an idling roller 276 of the second pair. To provide increased peripheral speed of the paper between the rollers 273 and 274 over that between rollers 275 and 276 I increase the pressure between rollers 273 and 274 merely by moving them closer to each other in the direction indicated by the arrows and space rollers 275 and 276 slightly farther apart, likewise as indicated diagrammatically by appropriate arrows, and also exaggerted. In this embodiment, solely for economy of production, I may make both powered rollers 273 and 275 with yielding surfaces, but accomplish my differential movement of the paper by the difference in pressure as above stated.

In this use of this second modification the pressure between the two pairs of each set of rollers can be adjusted by hand by moving the mounting instrumentalities of each roller closer to or further from the other member of each pair as previously described and as clearly shown in Figures 7 and 9. I may prefer, however, to use the automatic devices controlled by the moving paper itself as through automatically acting plungers to change the relative pressure between the rollers of each pair respectively, all as described in said co-pending application.

In those instances in which it is desired to use this aspect of my invention to create tension instead of slack it will be understood that the position of the various paired rollers constructed as above according to any one of my three embodiments are reversed. That is, the following pair will apply greater tension than the leading pair.

It is possible to accomplish the same result by introducing a gear train so that the powered member of the first pair of rollers is driven at a greater number of revolutions per minute than that of the second pair but consequent expense of construction and complications are avoided by any one of these three procedures.

Before more fully explaining the operation of the preceding and subsequent portions of my system I must describe a form of especially prepared paper 111 for my container-making operation if all of my advantages are to be secured. See Figures 10 to 14, Sheet seven.

In the lower edge of the paper, shown in Figure 11 before it has been severed, a plurality of "corner" notches 279 are formed, with "bottom-attaching" flanges 281 on which I apply a pressure sensitive adhesive. This arrangement, by operations later described, permits the formation of the paper first into a tube generally rectangular in horizontal cross section and second into a topless box as the flanges are tucked in and attached to the separate bottom sheet 63, preferably of corrugated paper of substantial solidity, to the outer edges 282 of which a similar adhesive has been applied. The corner notches permit the lower edge 281 of the tube to be turned under, as from the position shown in Figure 10 to that shown in Figure 12.

This adhesive, which may be formed with a latex rubber base or other and equivalent synthetic substance, is of such a character that after it once has dried it will adhere only to itself. Therefore if any treated area of my paper 111 is brought into contact with any other area thereof which is not so treated it will not adhere but if two treated areas are brought together they will firmly unite. The cost of so preparing paper is less than that of automatically applying glue as the formation of the paper proceeds and much more efficient since the primary usefulness of my system is by persons who are merchants not specialized manufacturers.

Along the surface of my paper I apply generally vertical rupture lines 283, either by scoring or perforations, so that when an unusual effective pull is applied to the paper it will break cleanly along these lines. These lines are spaced a mean distance equal to the circumference of the wells of my containers plus a sufficient length to form a substantially vertical over-lap or union 284, as well seen in Figures 10 and 13. The positioning and extent of this over-lap can be modified within reasonable limits. I have found those of Figure 4 and Figures 10 and 13 effective. As basis for such unions I apply this pressure sensitive adhesive upon vertical areas 285 and 286, one on one surface and the other on the opposite surface of the paper, adjacent each line of fracture so that when the paper is drawn into tubular form these areas are brought into contact and will adhere.

As seen in Figure 11 fracture line 283 is slightly spaced from the perpendicular with a top angularly projecting leading end 286. A (horizontal) length of this leading portion which I have found effective is of the ratio of one to sixteen reflecting the height or width of the entire sheet. This leading end facilitates the passage of the paper around the inner surface of the elevator well, as later described.

In addition to the foregoing, signalling instrumentalities 287 are formed in the paper to operate control devices including switch 155, all as fully described elsewhere. These instrumentalities may be of any desired character provided that when brought into operative contact with electrical or other switching mechanisms they close control circuits. I prefer either an opening, through which spring pressed switch members make contact with each other, as is illustrated, or a metallized section which completes an operating circuit when it reaches a switching member. Other equivalent means such for example as those which actuate photo electrical devices may be employed.

My system as described has advanced the paper to form a wall of one container from supply roll 81 by paired feeding rolls 83 and 85 with guides 211—213 therebetween toward the elevator well 59 and automatically has separated this length from that upon the supply roll, as later herein explained. This well is bounded by sides 301 along the inner surface of which the paper is advanced until its leading end is in the position of Figure 10 (or Figure 4) with vertical adhesive portions 285 and 286 in contact. Guides 303 and 305 form a guiding throat generally indicated as 306 between second paired rolls 85 and the well. A first switch generally indicated as 307 with a roller 309 and a spring contact 311 bears against the paper for performing one step through lead 312 for actuating a control circuit 313. See Figures 15 and 16. As the paper is further advanced about the interior of wall 301 it passes into operating contact with a second switch generally indicated as 317 which cooperates with first switch 307 to control circuit 313. This circuit, controlled in part by other and safeguarding instrumentalities shown in Figures 28 and 36, operates paper stopping relay 315 to time the operation of the paper feeding motor 183 to advance a length of the paper only sufficient for one container wall and to dispose it in proper position in the well.

The severance of a sufficient length of the paper 111 to form the side wall of a bag occurs when its leading end has reached substantially the point indicated by the arrow 319 in Figure 4. Switch 155 at about this point in the cycle operates brakes for supply spindle 81 and the paired feed rollers 83 through the pneumatic system of Figure 27 and the electrical network of Figure 28. The exact point depends upon the dimensions chosen.

As the leading section of the paper is propelled into this throat it is pierced and thereafter driven by needle-like teeth 321 which have relatively long and sharp ends and are angularly offset both horizontally and vertically from a sprocket 323 having links 324. See Figures 19 and 20. (In practice I have found angles of twenty degrees in each plane effective but I am not so limited.) Those skilled in the winding and reeling arts and particularly in the problems of handling a propelled end of a film-like sheet recognize that great difficulty has been experienced in the past in synchronization if guiding and moving perforations are pre-formed in the strip so that such perforations and the teeth must engage exactly. I meet this problem by making the necessary perforations by the teeth themselves where and when needed, with no requirement for synchronization.

Sprocket chain 323 is engaged and driven by wheel or gear 325, which receives its power through gear 255, and drives gears or wheels 327, 329 and 331 each disposed in one corner of a projection of the elevator well 59 and therebelow. Gear 255 is driven by motor 183 through power-transmitting trains as previously described.

Switch 317 includes a roller 337 through a leaf spring 339 upon which it is mounted connected to lead 338 which forms one side of circuit 313. When no paper is interposed therebetween roller 337 engages the body of sprocket 327. A lead 340 connects sprocket 327 and roller 309 of switch 307. Therefore circuit 313 is operated only when both switches 307 and 317 are closed, for reasons presently appearing. This circuit is of low voltage and grounded to the machine.

Wall 301 which forms the elevator well 59 at its top is fastened to a plate 341 below and supported by upper horizontal struts 53. an opening being formed in the top of this plate corresponding to a horizontal cross section of the well. At the lower end of the well the walls are strengthened by angle irons 343 fastened thereto upon the exterior surfaces of all sides thereof. As previously stated the elevator itself consists of a platform 61 carrying a central plate 62 upon which corrugated or other strong sheets 63 forming the bottom of each container are successively placed. As shown they are put in position by hand by the checker but they may be automatically placed if desired. A cylindrical guide rod or rail 345 surrounds and is movable with platform 61 to furnish a smooth surface over which the paper readily moves. Another and fixed cylindrical guide rod 346 is positioned slightly below and outside of the vertical projection of guide rod 345, and below and in line with all vertical sides of wall 301 to act as a guide for the lower edge of the paper and to hold it firmly in place against the toothed sprocket chain 323. This rod 345 is supported as by brackets 347 fixed to the upper surface of horizontal support 55.

The elevator is lowered from the position shown in Figure 17 to that in Figures 18 and 21 and thereafter raised by the operation of a plunger 349 with a piston 351 at its lower end operating within a main elevator cylinder 353.

While the elevator is in the upper position as shown in Figure 17, the paper, in the manner previously described, has been fed around the side wall 301 to form the side wall of an embryo bag. Thereafter when the elevator, with the corrugated sheet in place and goods piled thereupon, is lowered to the position of Figures 18 and 21, the goods will be disposed within the side wall of the embryo bag. Then when the bottom flanges 281 are attached to the side wall the container will be complete, with the goods therewithin. As the elevator raises the packed container to the position of Figure 17 the customer can take it and leave.

Initially to have brought the platform to the position of Figure 17, air has been admitted to cylinder 353 by a pneumatic tube 357, which in the form of my invention of which electrical control is shown in Figure 28 is operated manually by an elevator raising plunger 71, the activation of which will be described after the lowering of the elevator has been explained. This cylinder is exhausted through a similar tube 358 which can be operated by foot-controlled valve 65, with or without association with automatic valve 361 controlled by the fully automatic net-work of Figure 36, or the lowering operation can be fully automatic.

When my invention is employed in a retail establishment or the like it is desirable for the checker to retain control of the descent of the elevator, at least with automatic blocking of such descent except at the correct point in the cycle, as accomplished by one mode of operation explained in connection with the automatic net-work of Figure 36. This control at all times by the operator is highly important and is one of the objects of my invention. The checker preferably permits the elevator to descend only so rapidly as will enable her to pack the goods of each successive purchaser most quickly and efficiently and with a minimum of muscular effort. In effect by this controlled descent of the elevator platform from the standpoint of packing I provide a container of infinitely variable volume. The checker permits descent of the platform as slowly or as rapidly as permits her to place the purchased goods in position most quickly and easily.

An adjusting valve such as 359 as applied to each pneumatic line so that the effective pressure may be closely controlled. This adjustment is particularly important as shown in preventing too rapid lowering of the elevator. Except as modified by such a valve and by the foot valve the rate of descent is determined by the weight of the goods upon the elevator, as is desirable. Exhaustion of tube 358 through an automatically operated valve generally indicated as 361, normally moved to the position of Figure 27 by spring 369, prevents lowering of the elevator out of synchronism with the other operations when the net-work of Figure 36 is applied.

Even so under the above conditions I prefer to supplement this automatic valve with the foot control 65. When the parts are in position shown in Figure 27 free passage of air is allowed through chamber 362, created between pistons 363 and 364 and tube 365 from the cylinder 353 to the foot valve 65. When, however, by the circuits of Figure 36, relay 366 is actuated to bring blocking piston 363 of valve 361 between the tubes 358 and 365 the foot valve 65 is inoperable. Valve 361 and parts associated therewith can be omitted when elevator-lowering operation is entirely by the foot valve. By-pass 367 controlled by hand valve 368 may be used if required.

Alternatively the automatic valve can be omitted entirely, with the control circuits of Figure 27 utilized instead of those of Figure 36, both later described.

When, however, my invention is employed as in the packaging of articles in a manufacturing plant both the hand operated rasing valve 71 and the foot operated lowering valve 65 may be completely omitted. In that event the upper portion of tube 365 is directly connected to exhaust tube 358 by a tube 369 controlled by three-way valve 370 by-passing foot valve 65.

As is clearly shown in Figures 29 and 30 (Sheet fifteen) this foot valve consists of a foot rocker plate 371 pivoted at 373 by a supporting flange 374 and engaging a plunger 375 in a valve 376 normally pressed upwardly by spring 377 to bring a closure 378 to block an orifice between a lower chamber 379 fed by exahust line 381 and a chamber 383 giving access to tube 365. Thus pressure of a foot of the checker downwardly upon the right side of foot plate 371 as seen in Figures 29 and 30 will exhaust air through these tubes below the piston 353 thus causing the elevator to descend, provided, however, at this point the piston 363 has not been brought to a blocking position. The checker may easily determine the speed of descent in accordance with the weight of the goods which have been placed on the bottom 63 of the embryo bag and the speed with which she has filled it.

Control instrumentalities of great importance are carried by the elevator platform 61 and made successively operative and inoperative by the descent and ascent of the elevator. Before describing them I shall explain how in the semi-automatic form of my invention shown in Figure 27 I cause the elevator to rise.

In this embodiment the checker pushes inwardly control button 71 of the valve generally indicated as 390 from the inoperative position of Figure 33 to the operative position of Figure 34 thereby admitting air from inlet 389 through tube 391 to cylinder 353 and causing piston 351 to rise. This operation is carried out by pushing the plunger 393 against the power of spring 395, thus moving the plunger leftwardly as shown in Figures 33 and 34 and rightwardly in Figure 27. Thus air entering this valve when in the operative position of Figure 34 is laterally confined by pistons 397 and 399 attached to the plungers which form chamber 401 and freely passes therethrough to operate the elevator. When the checker relaxes pressure upon button 71 the spring forces the valve back to the position of Figure 33 wherein tube 389 connects with closed chamber 403, formed between pistons 405, attached to the end of the plunger most remote from the control button, and 399, and tube 391 connects only with chamber 401, now closed, with the air supply to tube 391 thereby cut off.

A construction and method alternatively and supplementary to the hand-operated valve 71 is provided by valve 406 operated by solenoid 407 and fed by pneumatic branch 408 from pneumatic inlet 409 both of which are described in connection with Figure 36. Valve 410 cuts off manual control valve 71 from pneumatic inlet 409, if desired. The automatic valve and its accessories can be omitted. Since manual valve 71 and automatic valve 406 are in parallel they can be used jointly, with manual control modifying the automatic.

Having explained the devices by which I cause the elevator to descend and then to rise I shall describe construction of important control instrumentalities carried by the elevator.

As previously stated, when the elevator descends it is necessary that the tube of paper which is to make the side wall of my container shall have been disposed about the inside of the elevator well and the adhesive-covered attaching tabs 281 at the bottom of this tube automatically shall be brought into contact with and fastened to the bottom piece 63 which descends with the elevator. This operation is actuated by a tucking bar control mechanism generally indicated as 411. See Figures 17–24. Until the elevator has again ascended it is necessary that the feeding of the paper forwardly to make the next tube within the elevator be prevented and that upon that ascent that operation be commenced again and automatically carried out. A double pole limit switch generally indicated as 413 accomplishes this result. Before describing this limit switch, illustrated in Figures 17, 18 and 21, and the safeguarding instrumentalities which are controlled thereby, I shall present in detail my novel tucking devices which attach a vertical wall to a base of each of my packages.

Operating mechanism for my tucking control device 411 will be best understood by Figures 22, 23 and 24 (Sheet twelve). An actuating portion thereof generally indicated as 414, carried by the elevator platform 61, comprises a dependent cylindrical support 415 for tucking switch cam 417 mounted in a central horizontal slot 418 at the base thereof for vertical movement therewith and limited horizontal movement relatively thereto. A guide pin 419 mounted so that it passes through the depending formation thus formed in the support and through slot 421 in the cam plate limits such horizontal movement. A leaf spring 423 normally holds the cam member in its rightward or switch operating position as seen in the drawings. This cam includes a switch operating lower surface 425 which upon the descent of the elevator operated a tucking bar switch generally indicated as 429. This switch comprises an actuating pin 431 which when the elevator descends to its lower position is forced downwardly by the cam against a resilient contact bearing arm 433 which is thereby depressed from the position shown in Figure 23 to that of Figure 22 and makes contact with fixed contact bar 435 thereby closing tucking bar circuit made up of leads 437 and 438. Arm 433 is resilient and normally carries the contact members out of circuit-making position.

Four tucking bars, each circular in cross section and identical in construction of which only two 451 and 453 are shown and described in detail since in themselves they are identical, are in part controlled by the above mechanism and with their associated mechanisms in part control it through instrumentalities controlled therewith. These tucking bars are carried by support plates 455 and 457 which are supported by vertical tucking operating rods 458 and 459 respectively pivotally mounted upon horizontal rods 460 and 461 respectively, these rods being mounted as shown in Figures 3, 17, 18 and 21 for pivotal movement in frames 463 and 465 respectively, each frame being quadrilateral in cross section and rigidly attached to plate 341 on the underside thereof. Mechanism for moving each of these tucker bars inwardly towards its opposite bar consists of irregularly formed brackets or support arms 466 and 467 fixed to the underside of plates 455 and 457 respectively and normally held in inoperative (or outward) position, as seen in Figures 17 and 18, by springs 468 and 469 respectively, one end of each of said springs being mounted upon main horizontal support plate 55. Separate guide rails 470 and 471 are mounted for movement with brackets 466 and 467 upon a central horizontal portion thereof. They are so disposed that when the tucker bars are in inoperative position, as shown in Figures 17 and 18, they press firmly against the inner side of sprocket chain 323 thus holding its links firmly against the paper from the inside while guides 346 hold it from the outside. When the tucking bars are moved inwardly, however, to the tucking position of Figure 21, these rails are moved away from the chain thus freeing the lower edge of the paper for release from the pins caused by the chain and the chain itself so that the tucking operation can be readily carried out. An actuating arm 473 for tucker switch cam 417 extends horizontally from the lower side of bracket 466 in line with the cam. Therefore when the tucker bars on their respective supports are moved inwardly, by means later described, toward operative position arm 473 engages switch cam plate 417 and moves it from the position shown in Figures 18 and 22 to that shown in Figures 21 and 23 thus permitting spring contact 433 to snap upwardly, thereby breaking circuit 437.

Such movement and that of the tucker bars themselves are carried out by pneumatically controlled plungers 475, 477, 479 and 481 operated within cylinders 483, 485, 487 and 491 respectively. The inward end of each of these plungers is in contact with the downward extension of each tucker bar support such as 466 and 467, as seen in Figures 17–21 in reference to the two thereon shown. Appropriate branches from air in-put tube 493 connect each cylinder through a control valve generally indicated as 495, the branch 497 for plunger 475 which operates switching cam 417 being supplied with a valve 499 by which the air in-put is slightly delayed so that circuit 437 which controls the in-put will not be broken until it is certain that all tucking bars have been fully operated. Alternatively support 466 may be held back slightly as by a weight.

Construction and operation of valve member 495 will be clear from Figures 31 and 32. The chamber block 503 encompassing movable chambers 505 and 507 is fed by a tube 509 branching from a tube 511 which leads from a source of compressed air. An outlet tube 513 exhausts to the atmosphere. The previously described feed line 493 for the various tucking bar plungers leads from this block. Chambers 505 and 507 respectively are formed between pistons 515, 517, and 519 which extend outwardly from a plunger bar 521 which is attached to an armature 523 which is normally pressed downwardly (as shown in those figures) to the position of Figures 27 and 31 by a spring 525. Coil 527 is fed by circuit 437—438.

In the position shown in Figures 27 and 31 in-put 509 leads to chamber 507 from which there is no outlet in the position as shown. In that position tube 493 for the tucking bars and exhaust 513 both communicate with chamber 505 thus exhausting the pressure behind the plungers which operate the tucking bars, thus rendering or maintaining them inoperative because of the force of their respective springs. When, however, switch 429 closes circuit 437—438 the pistons are moved from the inoperative position of Figure 31 to the operative position of Figure 32. At this time in-put 509 and feeding tube 493 both communicate with chamber 507 and the plungers for the tucking bar are operated, against the power of their respective springs. Exhaust 513 at this point is blocked because chamber 505 then has no other outlet. When the circuit 437 is broken spring 515 returns the parts to the prior positions.

Since valve 147 which controls the braking means of feed supply spindle 81 and the first feed rollers 83 is virtually identical with valve 495, it need not be described in detail. For simplicity the same reference characters as used in Figure 27 for valve 495 with a prime character added are applied to similar elements of valve 147. Tubes 145 and 195 through tube 493' are fed through valve 147, which is positioned as shown in Figure 27 by spring 519, as later explained. When coil 149 is actuated by closing of circuit 694—696 against the power of spring 519 control air flows through the valve from in-lets 511 and 509' to tube 493' whence it passes through tubes 145 and 195 which apply their respective brakes.

The operation of the tucking bars will be clear from the preceding portion of this specification. As the circuit 437—438 is closed upon the descent of the elevator each plunger engages the lower and inward portion of each of the four brackets such as 466 and 467 and moves it against its spring toward the center of the well from the position of Figures 17 and 18 to that of Figure 21. As the tucking bars so move they engage the lower attaching flaps or edges 281 of the paper 111 and force them inwardly, adhesive side up, against the lower outer rim 282 of the bottom piece likewise covered by adhesive. Upon contact these two surfaces adhere. The tucking bars are disposed in the space between this rim and the platform, with their leading edges adjacent place 62. See Figure 21. Corner notches 279 permit this folding operation easily to take place.

As just described movement of the elevator to its lower position operates the mechanism controlling tucking bars generally indicated as 411. Movement of the elevator to its upper position closes my limit switch, generally indicated as 413. This switch and the circuits controlled thereby enforce proper sequence so that the apparatus cannot be operated unless all the parts and the paper are in proper position in the cycle. Conversely the descent of the elevator 60 opens the limit switch but I provide sequentially operable control devices so that if at that time the parts and the paper are properly disposed all operations are carried out. The completeness of this automatic control of sequence is optional, as is later stated.

In my preferred automatic types, whether according to Figure 28 or Figure 36, my limit switch is operated by a relatively long operating shaft 527 which is attached to and depends from elevator platform 61 and is guided by a bearing 529 held by a support 531 fastened to cylinder 353. At its lower end it carries an actuating cam 533 of non-conductive material, which can be readily adjusted by a set screw. See Figures 17, 18 and 21.

The switch itself comprises a resilient contact arm 535 bearing an insulated cam-operated follower block 537 for contact with and operation by cam 533. A contact arm 539 like 535 but rigid is supported by an insulating block 541 which is attached by struts 543 depending from support 531. Resilient arm 535 carries two contacts 545 and 547 which are electrically isolated from each other and connected respectively to leads 549 and 551. Rigid arm 539 likewise carries two electrically isolated contacts 553 and 555 connected respectively to leads 557 and 559. Thus when cam 553 makes contact with arm 535 and moves it from the position shown in Figure 21 to that shown in Figure 17 resilient arm 535 will be bent leftwardly as so viewed so that contacts 545 and 553 engage each other and electrically join leads 549 and 557. Simultaneously engagement of contacts 547 and 559 makes contact between leads 551 and 559. See Figures 28 and 36 for the electrical networks controlled by the limit switch.

Therefore except when the elevator is in the complete upward position as shown in Figure 17 the circuits including these leads are open. In considering the electrical control system for semi-automatic or entirely automatic operation note that improper operation is impossible no matter in what position the apparatus has been left after previous use. Movement of the paper cannot again be started until the elevator has been raised to its upward position, following the operation of the limit switch just described. If the last previous use of the machine has left the paper in a position midway of a complete cycle I provide arrangements whereby that cycle is properly completed before the feeding of a new length of paper is begun. An operator need not concern herself with the portion of the cycle in which the machine is disposed when she begins a day's work, except that with the control circuit of Figure 28 if the elevator is not in the upper position she must position it there by operating valve 71.

The electro-mechanical elements or sub-combinations of my semi-automatic control, as shown in Figure 28, will next be described. Thereafter I shall review my operation and apparatus by briefly following the course of the paper from start to finish.

In this description and in the drawings I indicate certain time intervals, purely as convenient and illustrative. I particularly emphasize that such statements do not mean that I am limited to any particular duration for any operation but the relation of the time required by various steps helps an understanding of my mode of operation.

The major sequentially operable sub-combinations of my invention, as described in detail hereinabove, include the following.

The paper advancing mechanism:

Operated by motor 183 only when the elevator is up and the severed portion of the paper forming a side wall of a bag has been completely moved around the inside of the elevator well and lapped with the corner tabs in position;

Paper stopping and severing mechanism:

Controlled by solenoid 149 which is operable only when the elevator is up and enough paper has been advanced to form a side wall;

Control of rate of descent:

(Even in form of Figure 36) in accordance with goods to be packed;

Tucker valve bars:

Which are operable (by controls 411) to attach the side wall to the bottom only when the elevator is down and the paper for the side wall is completely in place;

Ascent of elevator (in form of Figure 36):

Only after bottom and side walls have been attached.

Once the machine has been started in the proper point in its cycle, all these operations follow in proper sequence. My invention includes, however, provision for making certain that no matter at what point stoppage has occurred operation will be started with all parts in proper relation so that successive cycles will be properly carried out without difficulty. In practice, my main switch may be left on over night or a holiday, but necessary stoppage does occur from time to time, as, for example, to install a new roll of paper. Electro-mechanical instrumentalities and the original introduction of current to the electrical network impose the necessary safeguards and assure proper sequence and protect all operations at all times. If I employ the network of Figure 28, the operator must operate valve 71 to assure the positioning of the elevator in the upward position, should it happen to be elsewhere.

To start operation as a day's work begins or after any other shut-down an operator closes the master switch 69 associated with hold down coil 676 to feed current (in any preferred form but as built for commercial use of 110 volts 60 cycles) to the entire machine. Thereafter the operator whenever she desires can start the grocery belt by switch 49 by movement of her thigh to close the circuit to motor 47. The timing of these operations and of elevator in the semi-automatic forms and only the control of the grocery belt and that of the rate of descent of the elevator in fully automatic forms are within the control of an operator, conditioned somewhat by the weight placed upon the elevator. As later explained, however, many operations can be and have been broken down into a series of hand operations.

The closing of this main switch 69 through main leads 597 and 598 and branch 600 actuates transformer 601, the return being through lead 602, which produces a control current (in present practice of 24 volts) for the circuit 313 grounded through the machine and controlled by the paper stopping switches 307 and 317 as described in connection with Figures 16 and 17.

The following instrumentalities are also actuated by the introduction of the control current to make the automatic portion of the machine operable and to afford the time lag which is necessary to place the parts and the paper in proper cyclic relation if necessary.

Current is first fed to an initial master protective thermo-delay relay 603 which is normally open. After an interval of say fifteen seconds this relay is closed and current passes through contact 604 to main starting relay 605 and pulls its contact bar 607 downwardly, as seen in Figure 28 held horizontally, against the power of compression spring 609 to a position wherein it bridges contact 610 and lead 611. This delay is necessary in order that the circuit controlling the locking relay 625 can be completed to operate the instrumentalities which impose the necessary sequence in the paper feeding operation for the bag being currently made and the one which follows it. This relay prevents the feeding of a second side wall into the elevator well before the one already there has been discharged. It also prevents the possibility that the automatic control be so disposed that a second bag cannot be formed. This circuit is automatically broken, however, when the side wall is tucked under and attached to the bottom piece 63 by the operation of switch 429. Consequently this locking sub-combination will next be described.

The locking relay comprises a master relay 627 normally pulled downwardly to the circuit-open position shown in Figure 28 by a tension spring 629. When its armature is actuated it is moved upwardly so that its contact 630 bridges leads 631 and 633, the latter of which through lead 634 is connected to in-put 598. The detent relay 635, normally moved leftwardly as seen in Figure 28 by compression spring 637 and with its head 638 bearing against the base of relay 627, slips into detent annular notch 639 in the contact relay 627 when the armature of the latter pulls the device into bridging position against the power of the spring. This armature of relay 635 is fed by leads 641 and 642, the latter of which joins lead 438 which is controlled by tucker bar switch 429 so that the circuit is open when the tucker bars are not operative. When switch 429 is closed this leg is connected through leads 437 and 634 to main 598. The other leg 641 is connected to main lead 597. When the coil 635 is energized the detent bar is pulled to the right unlocking the detent notch 639 and the relay 627 so that when the armature of the latter is not actuated tension spring 629 will pull it to the position shown in Figure 28. This contact bridge 630 is held locked in position thereby closing contact points 631 and 633 after armature 627 has been actuated until coil 635 unlocks this relay whenever upon the lowering of the elevator the tucker bars are operated.

After a delay of say fifteen seconds current reaches lead 611 as previously stated. If the locking relay has been cleared and assuming limit switch 413 to be closed, as is possible only when the elevator has been raised, current first passes through leads 649 and 559, limit switch 413, lead 551, the operating coil of master latching relay 627 and lead 650 to coil 652 of paper starting relay 654. This relay carries a bridging member 656 adapted to connect leads 657, extending from lead 611, and 658. A compression spring 659 normally moves this bridging member to non-contact position as shown in Figure 28 except when coil 652 is actuated. The opposite end of the winding of relay 652 by a lead 661 passes through a thermo-delay relay 663, normally closed, and by lead 665 is connected to main 597. When this relay 663 is closed it feeds the paper, as later described. This thermo-delay relay 663, set for say four seconds, is operated to open position through a lead 667 connected to main 597 and a lead 669 which carries contact point 631 of the master relay of the latching relay, which has been locked in circuit-closing position. Coil 652 also has been actuated to place bridge 656 between leads 657 and 658 because of the circuit fed to it from locking relay 627. The bridge 630 after say ten seconds breaks the circuit through relay 663.

In the meantime, however, bridge 656 has been operated by the excitation of coil 652 to bridge leads 657, connected to 611, and 658 to pass current through thermo-delay feed relay 671 which is normally closed. This relay, however, fed through lead 673 to in-put 597, is broken in say three seconds. The reason for this short holding action imposed by relay 671 is to make certain that the leading end of the paper will be fed from rollers 85 into engagement with switch 307 whereat circuit 312—313 will be broken and paper stopping relay 315 will be closed thereby continuing operation of paper feeding motor 183. The series arrangement of switches 307 and 317 insures uninterrupted paper feeding until the side wall has been completed.

While this feed delay relay 671 is closed, however, current flows through lead 672 and through leads 557 and 549 (connected by contacts 545 and 553 of switch 413) to lead 675 to the paper starting motor 183 thereby starting the paper feeding operation even though the switches 307 and 317 and the circuit 665—667 happen to be open. Thereafter, however, with the circuit 649—557 closed through relay 315 current flows to the feeding motor 183 through 607–649–315–557–549–675 irrespective of bridge 656. Once paper feeding has started, it is imperative that it be not interrupted until the tube is formed. Consequently once bridge 630 is moved upwardly to operative position it is locked therein by detent-head 638 and detent groove 639 until upon the lowering of the elevator the tucking bars are operated.

To make certain that there is no manual interference with the paper feeding until the tube has been completed I place a holding relay 676 fed by lead 677 from main 597 and by lead 678 in series with paper feeding motor 183. By reason of this arrangement the master switch 69 cannot be opened by hand until the above described electrical arrangements have completely operated the elements controlled thereby.

In the preceding portion of this description of the electrical network of Figures 28 no account has been taken of the fact that before the formation of the tube which forms the side wall of the embryo box, it has been necessary to sever the paper at line 214 by the application of breaking force to supply spindle 81 and rolls 83 by the closing of the circuit which is controlled by switch 155 operated by signalling openings 287 or the like in my especially prepared paper.

The application of braking force is by solenoid 149 as previously described. Again the momentary introduction of a circuit-holding element is necessary so that the continued feeding of the paper by rollers 85 while the rollers 83 and the supply roll 81 are motionless will fracture the paper. If on the other hand the circuit remained closed the device would be inoperative for the next cycle.

With the limit switch 413 closed, assuming the main starting relay 605 and motor starting relay 652 to be actuated, and of course the elevator at the top of the well, current flows through leads 557, limit switch 413 and lead 549 to paper timing signal relay 682, normally pressed to the position of Figure 28 by compression spring 683, and through it to switch 155, shown in Figure 4. As soon as signal 287 passes between the rollers of this switch, contact is made to the solenoid shown diagrammatically as 149, which is also shown in Figure 13, which under the influence of compression spring 150 operates valve 147 which applies braking force to both the paper roll 81 and the first feeding rolls 83. This operation is carried out by the closing of switches 684 and 686 when through lead 688 circuit is completed. Short lead 690 holds these switches closed. Switch 686 fed through leads 692 (connected through 634 to main 598 passes current to solenoid 149 through lead 694, the return being by 696. This holding action is necessary since the mechanical parts controlling the movement of the paper have some inertia and the signalling instrumentality moves past the switch contacts relatively rapidly. This by-pass continues effective until the limit switch 413 opens when the elevator descends, preparatory to another complete cycle. During this period inadvertent movement of the paper supply is prevented. In the meantime, however, the sudden stoppage of the paper has broken the paper upon the cleavage line 214 between the first feed rollers 83 and the second pair of feed rollers 85 and the paper has been advanced by the second pair of rollers 85, which continues to be driven by the motor 183. This separated leading portion is advanced to form the tube as previously described. When the elevator descends with its next load limit switch 413 is broken and coil 682 deenergized ready for the formation of the next side wall after the next cycle has been completed.

To summarize the operation carried out by the foregoing electrical network it will be assumed that after a regular run of my machine has been under way (so that there is no question of initial delay) a completed bag has been raised to the level of the counter and the machine is ready for another cycle. The limit switch 413 is closed and the tucker bar operating switch 429 is open. Following the previous severance of the paper 111 its leading end is at the fracture line 214. It must be advanced to and about the interior of the elevator well 59 and the amount necessary for the formation of the next vertical wall severed from that remaining on the roll. At this point the bridge 656 is in contact position, for with the closing of the limit switch bridge 630 is also closed and the latching relay locked. Current then flows to the feeding motor 183 through lead 649, relay 315 and lead 557 because since switches 307 and 317 are open, circuit 313 and relay 315 are in circuit closing position, for say about three seconds. Signal 287, however, through switch 155 activates relay 682 to operate double pole switch 684—686 to operate solenoid 149 to apply braking force to the supply spindle 81 and the first feeding rollers 83 to sever the paper necessary for the bag wall, the leading end of the paper now being at about point 319 (Figure 4). By about this time this leading edge of the paper has passed switch 317 which through relay 315 breaks one branch of the circuit. The alternate circuit through bridge 656 and feed delay relay 671 is effective to continue the feeding operation, say for some three seconds, sufficiently long for the leading end of the paper to reach the first switch 307. The timing of these two circuits is not critical, for a slight overlap does no harm. After say ten seconds, slightly more than the time necessary for these operations, relay 663 breaks the circuit to the locking and paper starting relays. During this interval, the checker has placed a bottom piece 63 on the elevator platform 62 and is starting the cashing up and arrangement of the purchases of the next customer. In this semi-automatic arrangement, she then releases the elevator piston 351 by the foot rocker plate 371 and the elevator descends. The limit switch is opened. When the elevator reaches the bottom the tucker bars operate, completing the bag by attaching the wall to the bottom and unlocking the latching relay. Then by operation of valve 71 the checker raises the elevator ready for another cycle. In practice, the operator knows when the tucker bars have operated for she hears a slight click.

As previously stated the various operations which have been described hereinabove may be carried out by separately performed hand switching operations. In fact, earlier and more simple embodiments of my invention were and are so operated. Although hand switching loses the advantages of automatic operation with complete certainty and omits safeguards which impose proper sequence such arrangements have proved entirely practicable. The lowering of the elevator may be by a hand operation through a valve such as 65. Thereafter the circuit to the paper feeding motor 183 may be held closed by a hand operated switch until the paper is propelled about the inner wall 301 of the elevator well. In practice, the exact timing of the opening of this circuit without automatic control is the only operation which has proved somewhat difficult to carry out by hand. Before I open the paper feeding circuit I press a switch corresponding to 155 to apply a brake to the feeding rollers 83 and the supply spindle 81. In actual hand operation it is sometimes desirable to stop the feeding operation and cut the paper by hand into the required length and then to start and stop the feed again.

After the paper has been fed completely about the well and over-lapped and fastened thus making a side wall for an embryo bag, the circuit to the feeding motor 183 having been broken, the elevator platform has been raised by the operation of valve 71. The packer may place a bottom piece upon the platform and proceed with the packing of the embryo bag and as previously described by the operation of a hand valve lower the elevator to the bottom of the well. Thereupon a switch 429 may be closed by hand to operate the tucking bars as by a solenoid and valve or, as in certain highly simplified forms of my operation, a worker may push the tucking bars into position by hand. Thereafter with the bag completely formed with the goods therein by closing the valve 71 the elevator rises for a new cycle.

As previously stated I may substitute completely automatic control, as illustrated in Figure 36, for the largely automatic control of Figure 28. When my invention is applied to a retail establishment it is desirable for the operator to retain control of the rate of descent of the elevator although without completely automatic control I may prefer to make it impossible for her to cause the elevator to descend except in the correct point in the entire cycle. When my invention is applied to the successive packaging of objects, preferably uniform, as of parts in a production operation, the lowering of the elevator can be entirely automatic.

To simplify and shorten description, those control elements which are common to both the semi-automatic and the automatic forms hereof when they appear in both Figures 28 and 36 are identified by the same reference numerals with a prime character added in Figure 36. I am not repeating, except in summary, the portions of the control arrangements which, except for minor and obvious modifications, are common to both forms.

For simplicity the following description will start with the assumption that at least one complete cycle has been completed and enough of a subsequent cycle to have disposed the tucking bars ready for operation with the elevator ready to be raised after their operation has been completed. The following statements of elapsed time including that of the tucking bar operation must be taken solely as illustrative, its value lying not in any specific number of seconds but in the approximate time relation of the various operations, to none of which am I limited:

|   | Seconds |
|---|---|
| Tucking bar operation (in and out) | 5 |
| Automatic raising of elevator | 5 |
| Movement of paper to and around well 301 to form side wall of a new container (from break line to mouth of well, say 3 seconds) | 10 |
| Lowering of elevator (optional with operator as when invention is applied to chain store operation); in a production operation say | 5 |

The total elapsed time in the foregoing illustration applying to operation as in a retail store is twenty seconds and in an entirely automatic operation twenty-five seconds. Consequently between the initiation of one tucking bar operation and the start of the next lowering of the elevator this time lag of twenty (or twenty-five) seconds must be imposed by a major time delay network. During this period the tucker bar operates, the elevator rises, a new bag side is formed, the loaded bag may be removed, and another bag bottom is placed in position, and, in the full automatic form, the elevator descends ready for the tucking operation and another cycle.

The tucking bars are operated by solenoid valve 495', in the manner previously described, which is energized by lead 681' which is closed by tucker bar switch 429. Simultaneously with this actuation pull-down coil 721 is activated to operate this delay network by completion of its energizing circuit 727—729 completed through lead 732 to feed 579'. Against the power of compression spring 735 it pulls downwardly, as viewed in Figure 36 held horizontally, bridges 741 and 743. Bridge 741 simultaneously places main thermo-delay relay 745, which is normally closed, and holding relay 747 in circuit through lead 749 and feed 597' on one side and 751 and 753 on the other. The energizing circuit of the coil 721 is broken as soon as the tucking bars have been operated, but holding relay 747 remains operative, in the illustration stated above for a period of either twenty or twenty-five seconds, long enough for the completion of the above described operations. At the same time bridge 743 has closed the circuit 755—597' to the heating element of the normally open thermo-delay relay 757, connected by lead 759 to lead 761 connected through leads 634' and 602' to feed 598'.

In the illustration given this relay 757 remains open for five seconds in order to permit the tucking bars to be operated and retracted. When relay 757 is closed after this interval, current is applied through lead 765 to the two solenoids 366 and 407 which operate elevator-control valves 361 and 406 respectively. Operation of valve 361 at this point brings piston 363 into position to block exhaustion of air through tubes 358 and 365 and the operation of valve 406, as is about to be fully described, applies air to cylinder 353 thereby raising the elevator automatically. Since thermo-delay relay 745 is closed for say twenty seconds (when control of descent is in the hands of an operator) and then opens, all of the instrumentalities described immediately hereinabove are thereupon de-energized. It should be noted that coil 747 holds the foregoing circuits closed or operative while the foregoing operations are carried out.

At this point the completed package has been raised to the level of the counter, with a new bag wall in position in the well. If the by-pass tube 369 is closed by operation of three-way valve 370, as is shown in Figure 27, the operator starts the next cycle by use of foot valve 65, the exhaust passages being open and valve 406 blocking the intake until the next cycle. If the three-way valve has cut off the foot valve, the main holding relay 747 is set to open in say twenty-five seconds, instead of say twenty, it being understood that all time periods are merely illustrative. Even if foot valve 65 is cut off the rate of descent of the elevator is conditioned by the weight placed upon it and the adjustment of the bleeding valve 359. Consequently even in automatic operation the placing and character of the objects placed upon the elevator platform determines the rate of descent, within very close limits if valve 359 is carefully adjusted. If operation is by foot valve the operator without the use of her hands controls descent in accordance with her speed in packing and the sizes and weight of the objects packed. The cutting off of the descent of the elevator by the block 363 is a useful safeguard for an unskilled operator. If desired, however, by-pass 367 can be opened so that the automatic valve 361 is inoperable.

In-put valve 406 is normally positioned inoperatively by spring 775 as shown in Figure 27. At this point release of air from cylinder 353 in a direction toward the in-put is blocked by chamber 777 formed between pistons 785 and 787 and, if valve 410 is open, by manual valve 390. Air from the in-put 409 passes through tube 408 to chamber 783 wherein it is held between pistons 781 and 785. As current is applied to coil 407 as described above the valve is raised against the power of spring 775 so that air from in-put 408 flows through chamber 783 and through tube 357 to cylinder 353 thus raising piston 351 and the elevator. Simultaneously, however, as previously stated, solenoid 366 has operated valve 361 to block exhaust tube 358.

If by-pass valve 410 to hand control 71 is left open that instrumentality can be operated as an auxiliary to the automatic valve 406, but preferably it is closed when the network of Figure 36 is employed.

My invention may be summarized in part in terms first of handling a strip of paper or the like to form a portion of a container; second of handling goods to a position within said container, completing the container and moving said loaded container to a station whereat it can be readily grasped and removed; and third of controlling and timing the elements or steps of said first two series of operations.

Propellers shown as pairs of spaced rollers advance the leading end of the strip from a roll, upon a revoluble vertical support, through a plurality of guides or a guideway, including an elevator well or vertical enclosure, to a position wherein it forms the side wall of the embryo container. Propellers in the form of teeth about the well or enclosure perforate and engage the strip and complete its advance. Revolution of the first propeller and of the support for the paper is arrested or disabled, as by a brake applied to the first propeller and to the support, when a section of the strip sufficient for one wall has been advanced past a predetermined rupture line, the distance between this rupture line and the leading end of the strip as so advanced being slightly greater than the horizontal perimeter of the well or enclosure. Thereupon this leading section is severed at the rupture line by its continued movement and is advanced about the elevator well or enclosure and its vertical edges affixed to each other thereby forming the side wall of the embryo container. To facilitate this break slack is built up between the first two propellers by advancing the strip more rapidly by the first than by the second thereof.

When my invention is used in a retail store, this being the form in which it was first employed, the purchaser places the goods which she has selected upon a conveyor which moves it past a checker. The checker arranges the goods upon a horizontal bottom member at a station beyond the conveyor and easily accessible both to the checker and to the purchaser. This bottom member, of the embryo container which is about to be completed, rests upon an elevator. With the goods so arranged the elevator descends into its well or enclosure, the rate of descent being conditioned by the weight of the goods as placed upon the bottom member (and in a semi-automatic form as by the foot of a checker), about which the vertical side wall has already been formed, to a horizontal plane slightly above the lower edge of the embryo wall. Tuckers force the lower edge of the side wall into adhesion with the downward outer portion of the lower side of the bottom wall of the container, now with the goods therewithin, whereupon the elevator rises and the purchaser takes the container and departs.

The third portion of this summary is in terms of its control. This control, preferably electric and hydraulic, may be fully automatic or entirely manual, or partly automatic and partly manual. In the former case all of the foregoing operations and others are synchronized and automatically timed except that the operator if in a retail store starts the elevator downwardly. (In fully automatic operation, even this operation is pre-timed.) Provisions are included to make certain that each operation, even in a semi-automatic form, will be completed in sequence and without possibility of harmful interference by the worker.

Preferably my paper strip is especially prepared with vertical break or rupture lines properly spaced, pressure-sensitive adhesives covering areas of the paper and also of the bottom member which are brought together to complete the container, and corner notches to facilitate tucking. Again if desired all operations on the paper may be carried out manually.

The above summary is not complete or definitive.

It is emphasized that orientation in this specification and in the subjoined claims is in accordance with the definitions given hereinabove and is descriptive and not limiting.

The advantages of my invention will be clear from the foregoing specification, the attached drawings and the subjoined claims.

I claim:

1. A method of packaging articles of random characteristics which comprises forming a carton around the articles by providing a bottom member and a side wall which when joined form the permanent carton, the interior of said side wall having a shape and size into which the bottom member can be placed with the outer edges of said bottom member disposed adjacent the bottom of the interior of said side wall, first placing the random articles upon said bottom member, then disposing said bottom member with the articles thereupon within the interior of said side wall with the bottom edges of said side wall adjacent the outer edges of said bottom member, and joining said edges of said wall and said edges of said bottom member thereby completing said carton and said packaging.

2. A method of packing articles of random characteristics which comprises providing a vertical wall of a container in process of formation, placing a substantially flat member which becomes the bottom wall of said carton above said vertical wall, the dimensions and configuration of the interior of said wall and said flat bottom member being such that said bottom member may move freely within but closely adjacent said vertical wall, successively placing such articles upon said flat member, lowering said flat member with said articles thereupon within said vertical wall to a position adjacent the bottom thereof, and completing said container by affixing the bottom of the side of said wall to the outside edges of said bottom member with the articles thereupon within said vertical wall to a position adjacent the bottom thereof, and completing said container by affixing the bottom of the side of said wall to the outside edges of said bottom member with the articles thereupon within the container so formed.

3. A method of packaging which comprises severing from a roll of paper a length slightly more than sufficient to form the vertical wall of a container, placing pressure-sensitive adhesive upon at least one vertical edge of said strip where when said strip is formed into a container said edges will overlap and join, forming notches in the lower horizontal edge of said severed length to facilitate it being tucked under the outer lower edge of a bottom member for said container, at least one of said last mentioned edges bearing pressure-sensitive adhesive, moving said severed strip about the interior of a wall of a vertical enclosure, joining the vertical ends of said strip by said adhesive thereupon, placing a plurality of goods to be packaged upon a stiff bottom member, lowering the bottom member with the goods thereupon to a plane adjacent the lower edge of said strip, tucking the lower horizontal edge of said strip inwardly against the bottom of said bottom member to which through said adhesive it is thereupon joined, thereby forming a container with a bottom wall and a side wall with the goods therewithin, and raising said container with the goods therein to the top of said enclosure.

4. A method of forming a package which comprises moving a strip of paper about the interior of a vertical enclosure which forms a guideway therefor thereby forming a vertical wall of a package in process of formation, joining the vertical ends of said strip thereby completing said vertical wall within the interior of said enclosure, placing goods to be packaged upon a bottom member which becomes the permanent bottom member of said package being formed, lowering said bottom member with the goods thereupon within said wall so formed to a plane adjacent the lower edge of said vertical wall, tucking the lower vertical edge of said wall inwardly against the lower horizontal outer edge of said bottom member, joining said lower edge of said wall and said bottom member thereby forming a package from said side wall and said bottom member with the goods therewithin, and raising said package with the goods therewithin to the top of said enclosure.

5. A method of packing merchandise which consists of successively placing articles of random weight which have been selected by a purchaser upon a substantially flat member which becomes the permanent bottom member of a container which is being formed, lowering said bottom member, and as it is so lowered placing other articles upon the top of said first mentioned articles, controlling the rate of descent of said bottom member in accordance with the weight of said articles as they are placed on said bottom member, after all of the articles have been placed upon said bottom member and it has reached to its lowest position completing the container by affixing sides to said bottom member with the articles within the container so formed, and thereafter raising said completed container with the goods therewithin to a position at which it can readily be grasped by the purchaser and removed.

6. A method of merchandising which comprises forming a paper side wall of a container which is in process of formation about a well for an elevator, said well furnishing a guideway for the above step, placing a bottom member of a container in process of formation upon a horizontal platform of the elevator, said bottom member being disposed above and within the cross sectional area of said vertical wall and becoming the permanent bottom of the container being formed, recording the price of goods which have been selected by a purchaser and substantially simultaneously moving the goods toward and placing them successively upon the bottom member, lowering said elevator with the bottom member and the goods thereupon within said paper side wall so formed, affixing the side wall to said member with the goods therewithin after the elevator has descended thereby completing said container, and raising the elevator bearing the container so formed with the goods therewithin whereupon the purchaser can grasp said container with the selected goods and depart.

7. In a packaging machine, an elevator, a well for said elevator, means for raising said elevator, a bottom piece for a container being disposable upon said elevator after it has been raised, a support for a roll of paper, guides between said support and said well, means for severing from said roll a section of paper sufficient to make a wall for said container, propellers for advancing a leading end of said severed section from said roll to and about said well and around the internal side thereof thereby forming said wall, means for lowering said elevator with the bottom piece thereupon, and tuckers for pushing a lower horizontal edge of said severed paper underneath the bottom member after said elevator has been lowered, adhesives being provided for affixing said tucked edges and the bottom side of said bottom member and for affixing the vertical edges of said side wall thereby completing the side wall of the container to which said bottom has been attached.

8. In a packaging machine, an elevator, a well for said elevator, means for raising said elevator, a bottom piece for a container being disposable upon said elevator after it has been raised, a support for a roll of paper, guides between said support and said well, propellers for advancing the leading end of said roll from said support towards said well, means for causing slack to build up between said roll and said support, means for severing a section of paper sufficient to make a wall for said container from said roll in the section of said paper containing the slack so built up, means for advancing said severed section from said roll to and about said well and around the internal side thereof thereby forming said wall of said container, means for lowering said elevator with a bottom piece thereupon, and tuckers for pushing a lower horizontal edge of said severed paper underneath the bottom member after said elevator has been lowered, adhesives being provided for affixing said tucked edges and the bottom side of said bottom member and for affixing the vertical edges of said side wall thereby completing the side wall of the container to which said bottom has been attached.

9. In a packaging machine for automatically producing a series of containers, an elevator, an elevator well, means for raising said elevator, a bottom piece for a container being disposable upon said elevator after it has been raised and being adapted to support goods placed thereupon, a support for a roll of paper, guides between said support and said well, severing means for separating from said roll a section of paper sufficient to make a vertical wall for said container, propelling means for advancing a leading end of said severed section from said roll to and about said well and around the internal side thereof thereby forming said wall, means for lowering said elevator with the bottom piece thereupon, tucking means for pushing a lower horizontal edge of said severed paper underneath the bottom member after said elevator has been lowered, adhesives being provided for affixing said tucked edges and the under side of said bottom member and for affixing the vertical edges of said side wall thereby completing the side wall of the container to which said bottom has been attached, and a control system including instrumentalities for sequentially operating and timing all of said means and thereafter repeating said cycle.

10. Apparatus according to claim 4 wherein said propelling means includes two pairs of spaced rollers for advancing the leading end of the strip maintained by said support which has been placed in contact with the first of said pairs, a drive for one roller of each pair and the other idling, each of said driven rollers being revolved at the same number of revolutions per minute; and said severing means including instrumentalities for applying pressure to the pair of rollers relatively adjacent said support greater than that applied between the rollers of said second pair whereby slack is built up in the portion of said strip between said pairs; and said control system including instrumentalities for controlling the drive of both of said rollers and said support for holding said strip motionless up to the point of said slack between said rollers whereby the continued revolution of said second roller advances the strip further and severs it within the portion wherein slack has so been built up.

11. In a packaging machine, a conveyor upon which a purchaser can place goods purchased, a counter to which said conveyor carries said purchases, a cash register being disposed at one side of an adjacent said counter, an elevator well terminating upwardly within said counter, an elevator within said well, means for alternatively lowering and raising said elevator, said well being so disposed that a worker at said register may place said purchases upon a bottom piece disposed upon said elevator after it has been raised, a support for a roll of paper, guides between said support and said well, propelling means for advancing a leading end of said paper from said roll to and about said well and around the internal side thereof thereby forming a wall for a container for the articles placed upon said conveyor, severing means for separating from said roll a length of paper sufficient to make said wall, tucking means for pushing a lower horizontal edge of said severed paper underneath said bottom member after said elevator has been lowered, adhesives being provided for affixing said tucked edges and the bottom side of said bottom member and for affixing the vertical edges of said side wall thereby completing the side wall of the container to which said bottom has been attached, and a control system interlocking all of said means and including instrumentalities for sequentially operating and timing all of said means.

12. In an apparatus of the character described, an elevator movable between an upward position upon which goods may be loaded upon a member which has been placed upon said elevator and later forms the permanent bottom of a carton in process of formation and a downward position within a pre-formed wall of paper which later forms the outer wall of said carton, the lower edge of said wall extending slightly below the plane of said elevator when said elevator is in its downward position, said elevator being freely movable downwardly within said wall with said goods thereupon, said pre-formed wall having been provided, tuckers for forcing the lower horizontal edge of said wall into adhesion with the outer portion of the lower side of said bottom member when said elevator is in its downward position below and in alignment with said elevator, and a control operable when said elevator is in its downward position for operating said tuckers.

13. In an apparatus of the character described, an elevator well, an elevator movable within said well between an upward position whereat goods may be loaded upon a bottom member which has been placed upon said elevator and becomes the permanent bottom member of the carton in process of formation and a downward position after said goods are disposed thereupon and wherein it is disposed within a pre-formed wall of paper, said pre-formed wall having been provided and forming the permanent wall of said carton when completed, a guide at the bottom of said well and spaced slightly inwardly from the interior thereof and in a plane below that of the elevator when it is in its downward position within said pre-formed paper wall, the lower edge of said wall extending slightly below said plane, tuckers for forcing the lower horizontal edge of said wall over said guide and into adhesion with the outer portion of the lower side of said bottom member when said elevator is in its downward position and inwardly of said guide and free therefrom, and a control operable when said elevator is in its downward position for operating said tuckers.

14. In a packaging apparatus, a counter having a well substantially the size of a container to be formed, an elevator movable within said well, means for placing a pre-formed sheet of paper about the sides of said well, said pre-formed sheet of paper being substantially the length of the aggregate horizontal dimension of said sides plus an overlap and having notches at the lower corners thereof and having pressure-sensitive adhesive affixed to the overlapping ends thereof and to the lower edge thereof, and tuckers operable when said elevator is at the bottom of said well for forcing the lower edge of said container wall against the lower side of a bottom piece placed upon said elevator, said elevator being slightly smaller than said well whereby the edges of said bottom piece extend beyond the edges of said elevator, said tuckers being effective to force said pressure-sensitive adhesive upon said bottom edges against pressure-sensitive adhesive placed upon the underside of said bottom piece.

15. In a packaging machine, a conveyor upon which a purchaser can place goods purchased, a counter to which said conveyor carries said goods, a cash register being disposed at one side of and adjacent said counter, an elevator well terminating upwardly within said counter, an elevator within said well, moving means for alternatively raising and lowering said elevator, said well being so positioned that a worker at said register may place said purchases upon a bottom piece disposed upon said elevator after it has been raised, a support for a roll of paper, propelling means for advancing and guiding a leading end of said paper from said roll to and about said well and around the internal side thereof thereby forming a wall for a container for the articles placed upon said conveyor, instrumentalities for severing from said roll of paper a length thereof sufficient to make said wall tucking means for pushing a lower horizontal edge of said severed paper underneath said bottom member after said elevator has been lowered, fastening means for affixing said tucked edges and the bottom side of said bottom member and for joining the vertical edges of said side wall thereby completing the side wall of the container to which said bottom has been attached, and controls connected to said conveyor and to said elevator moving means and operable by a worker who stands at said cash register without her movement therefrom or the use of her hands for controlling the movement of said conveyor belt and the raising and lowering of said elevator.

16. In a packaging machine, a conveyor upon which a purchaser may place goods purchased, a counter to which said conveyor carries said purchases, a cash register being disposed at one side of and adjacent said counter, an elevator well terminating upwardly within said counter, an elevator within said well, means for raising and lowering said elevator, said well being so disposed that a worker at said register may place said goods upon a bottom piece disposed upon said elevator after it has been raised, a support for a strip of paper, propellers for advancing paper from said strip, instrumentalities for severing from said strip so advanced a length thereoff sufficient to make said wall, signals carried by said paper for operating said instrumentalities, propellers for advancing the leading end of said severed section of the paper to and about said well and around the internal side thereof thereby forming a wall for a container for the goods placed upon said conveyor, tucking means for pushing a lower horizontal edge of said severed paper underneath said bottom member after said elevator has been lowered, pressure-sensitive adhesive upon said tucked edges and the bottom side of said bottom member and the vertical edges of said side wall whereby upon contact said horizontal edges and said bottom are joined and said vertical edges are joined thereby completing said container, and control means operable by a worker who stands at said cash register without her movement therefrom and the use of her hands for controlling the movement of said conveyor belt and the raising and lowering of said elevator.

17. In a device of the character described, the combination of a packing machine, wherein a carton is made and filled, and a roll of especially prepared paper therefor; said paper comprising vertical rupture lines separated by distances slightly greater than the horizontal perimeter of each of successive containers to be formed in the machine, signals for operating tucking instrumentalities of the machine, corner notches facilitating a tucking operation, and having pressure-sensitive adhesive thereon where said vertical edges join to make a wall and also where the bottom horizontal edges of the paper after having been formed into a vertical wall are joined with a bottom piece; said machine comprising a counter, an elevator well terminating upwardly within said counter, an elevator within said well, means for raising said elevator so that a bottom piece for a container to be formed may be placed thereupon, means for lowering said elevator, a support for a roll of said paper, propellers for advancing a leading end of said paper from said roll toward said well, instrumentalities responsive to said signals for severing from said advanced portion of paper at one of said rupture lines a length thereof sufficient to make said wall, propellers for advancing said severed section to and about said well and around the internal side thereof thereby forming a wall for a container for the goods placed upon said conveyor, and tucking means for pushing a lower horizontal edge of said severed paper underneath said bottom member after said elevator has been lowered to a plane slightly higher than the lower edge of said side wall, said corner notches of the paper facilitating said tucking operation and said pressure-sensitive adhesive being placed on said paper where said vertical edges join to make said wall and also where said bottom horizontal edges are joined with said bottom piece; whereby upon contact said horizontal edges and said bottom are joined and said vertical edges are joined thereby completing said container, said elevator when raised bearing thereupon said completed container with said goods therewithin.

18. A method of packaging which comprises forming signaling instrumentalities, lines of rupture and indentations in a strip of paper, adding adhesive to parts thereof, and forming said strip into a roll; moving the end of said rolled strip about the interior of a vertical enclosure, stopping the movement of the roll but continuing the movement of the end of the strip thereby causing the strip to break along one of said rupture lines, moving said ruptured leading end about the interior of a vertical enclosure, said rupture lines being so placed in relation to the perimeter of said enclosure that said strip is slightly longer than said perimeter, goods to be packaged having been placed upon a bottom member which forms a permanent portion of the package being made and said bottom member with the goods thereupon having been lowered to a plane adjacent the lower edge of said vertical wall formed by said strip, tucking the lower vertical edge of said strip inwardly against the lower horizontal outer edge of said bottom member in response to the signals formed in said strip, and pressing said lower edge of said strip and bottom member together thereby forming a container with a side wall and the bottom a permanent part thereof with the goods therewithin.

19. In an apparatus of the character described, an elevator, a well within which said elevator is operable, propellers for moving about the interior wall of said well a length of paper slightly greater than that sufficient to form a vertical side for a package, and tuckers operable upon the descent of said elevator for pushing the lower vertical edge of said paper wall underneath and into contact with the outer and lower horizontal edge of a bottom member which has been placed upon said elevator, means for fastening said tucked-in edge of said paper wall and said bottom piece and the adjacent ends of said paper wall respectively having been provided.

20. In an apparatus of the character described, an elevator, a well within which said elevator is operable, propellers for moving about the interior wall of said well a length of paper slightly greater than that equal to the horizontal perimeter of a vertical side for a container and of a width slightly greater than the heighth of the container, tuckers for pushing the lower vertical edge of said paper wall underneath and in contact with the lower outer horizontal edge of a bottom member which has been placed upon said elevator, means for fastening said tucked-in edge of said paper wall and said bottom piece and the adjacent ends of said paper wall respectively having been provided, and control instrumentalities operable by said elevator when it descends to a plane immediately above the edges which are so to be tucked for operating said tuckers.

21. In apparatus of the character described, an elevator well the interior of which also serves as a guideway about which a free end of paper is advanced to form a vertical side wall for a package, an elevator disposed within said well, said well with said wall of said package in position therein and said elevator being of such cross-sectional area that said elevator can be raised and lowered within said well, a first operating means for raising said elevator within said well, a second operating means for lowering said elevator within said well, propellers for advancing about the interior surface of said well a length of paper sufficient to form said vertical side wall for said package, and sequential control mechanism interlocking said first and second operating means and said propelling means and including instrumentalities which actuate said first operating means to raise said elevator and thereafter operate said propellers and maintain said second operating means inoperable until said propelling means has completed the formation of said vertical side wall with the elevator in its raised position.

22. In an apparatus of the character described, an elevator, a well within which said elevator is operable, an open-ended tube of paper being disposed within said well and close to the interior of the vertical wall thereof, with the bottom edge thereof being extended slightly below said well, the dimensions of said elevator being such that it is movable within and free from contact with said tube, and tuckers operable upon the descent of the elevator to its lowest point for then pushing the lower edge of said tube underneath and into contact with the lower outer horizontal edge of a bottom member which has been placed upon said elevator in its upward position and becomes a permanent member of the carton in process of formation and moves during the descent of the elevator within the tube of paper about said wall, adhesive means for fastening said tucked-in edge of said tube and said bottom piece having been provided, whereby said bottom member and said tube provide a container with the goods therewithin.

23. In a packaging machine, a walled enclosure the interior of which forms a guideway for a strip advanced thereabout, a mouth for said enclosure, a propeller driven for engaging a free end of paper delivered thereto and advancing it to said mouth, a series of teeth so mounted that they engage and pierce the strip as it is advanced to said mouth and then positively advance said strip around said guideway, a positive drive for said teeth, whereby said strip is advanced around said guideway, and a control operable by said strip and connected to said drive for disabling said drive when the leading end of said strip has been advanced around said enclosure and overlaps a trailing end thereof.

24. In a packaging device, a tubular enclosure corresponding in shape and size to a wall of a container to be formed, means for disposing a bottom piece for the container adjacent the lower end of said enclosure, teeth the points of which are slanted forwardly in the direction of paper advance and upwardly, a movable support for said teeth by which they are disposed in a plane slightly below said enclosure and thereabout, means for moving said support, means for delivering to said enclosure adjacent its under surface a leading end of a strip of paper slightly longer than the horizontal periphery of the wall to be formed and slightly wider than the (vertical) height thereof so that the lower horizontal edge of the strip is engaged and advanced by said teeth, tucking bars, a guide disposed inwardly from said enclosure adjacent the lower edge of said enclosure for holding the lower end of said strip in place after its advance, a support for said bars pivoted at a distance therefrom on which said teeth are movable against the exterior lower surface of the paper in a slight arc for removing it from said teeth and forcing it against the bottom piece, the forward slant of said teeth causing them to pierce and advance the paper and the upward slant facilitating the removal of the paper therefrom and from said guide by the action of the tucking bars.

25. In a packaging device, a tubular enclosure corresponding in shape and size to a wall of a container to be formed, means for disposing a bottom piece for the container adjacent the lower end of said enclosure, teeth the points of which are slanted forwardly in the direction of paper advance and upwardly, a movable support for said teeth by which they are disposed in a plane slightly below said enclosure and thereabout, means for delivering to said enclosure adjacent its inner surface a leading end of a strip of paper slightly longer than the horizontal periphery of the wall to be formed and slightly wider than the (vertical) height thereof so that the lower horizontal edge of the strip is engaged and advanced by said teeth, tucking bars movable against the exterior lower surface of the paper for removing it from said teeth and forcing it against the bottom piece, the forward slant of said teeth causing them to pierce and advance the paper and the upward slant facilitating the removal of the paper therefrom by the action of the tucking bars, and means for moving said support and said teeth thereupon.

26. In an apparatus of the character described, a conveyor upon which a purchaser can place goods purchased, a counter to which said conveyor carries said purchases, a cash register being disposed at one side of and adjacent said counter, an elevator well terminating upwardly within said counter, an elevator within said well, said well being so disposed that a worker at said register may place said purchases upon a horizontal sheet adapted to form a bottom of a container to be formed, said sheet being disposed upon said elevator after it has been raised, a support for a roll of paper in strip form which is to be advanced to and about said well to form the side wall of said container, an operable brake for said support, two spaced strip-propellers positioned between said support and said well; the first of said propellers relatively adjacent said support comprising two rollers between which the strip is engaged, a driven roller and an idling roller, an unyielding core for said driven roller, an elastic outer surface supported by said core and engaging the strip upon one surface thereof, said idling roller being rigid and having a rigid surface engaging the strip upon the other surface thereof, an operable brake for said driven roller of said first pair; said second strip-propeller comprising two oppositely disposed rollers, one driven and the other idling, mechanism for revolving the driven roller of each said strip-propellers at the same number of revolutions per minute whereby slack is accumulated between said propellers following the increase in lineal speed imparted to the strip by the damming up of said elastic surface as it engages and advances the strip; a first control for applying said brakes to said support and said first strip-propeller, a signal being provided to operate said first control and hence said brakes when a length of the strip slightly greater than the horizontal periphery of said well has passed a rupture line and when a portion of the strip relatively nearer said support is still in engagement with said first propeller, said stoppage of the main body of paper while the leading end is still propelled causing it to break at the fracture line, a guide for directing the severed end of the strip to contact with the interior surfaces of said well and about said surfaces, propelling teeth the points of which are slanted forwardly in the direction of paper advance and also upwardly, a movable support for said teeth by which they are disposed in a plane slightly below said well and thereabout and positioned to engage the lower horizontal edge of the severed leading end of the strip advanced thereto, means for rotating said support so that said teeth advance the strip about said interior surface, the width of said strip being slightly greater than the heighth of the container and such excess being disposed below the plane to which the elevator descends, thereby forming a margin, a guide about said wall spaced slightly inwardly therefrom engaging said margin, a corresponding guide for the upper portion of said strip carried about the edge of said elevator, said teeth engaging the strip in said margin, means for driving said propeller-revolving mechanism and rotating said teeth-support, a second control for said driving means which disables said driving means after said severed section has been propelled about the interior of said wall of said elevator well thereby forming said wall of said container, said second control being operated by said severed strip, tucking bars movable against the outside of the lower surface of the paper for removing it from said teeth and forcing it inwardly and upwardly against the bottom piece, a support for said tucker bars upon which they are pivoted for movement against the lower edge of the paper through a slight arc, motive means for moving said tucker bars through said arc, a plunger supporting said elevator and working within a cylinder, a piston on the lower end of said plunger, an operable raising valve for admitting a fluid to said piston whereby the elevator is raised, an operable lowering valve for bleeding said cylinder whereby said elevator descends by gravity, a regulating valve controlling such bleeding by which the rate of descent can be finely adjusted so that it is closely proportionate to the weight placed upon said elevator, a connection between said lowering valve and said elevator raising valve and said first and second controls for maintaining said raising valve operative and said lowering valve inoperative until said second control has applied said brakes to sever said advance strip and said second control has stopped said driving means, timing devices associated with said elevator raising and lowering valves respectively which when operative determine the intervals between each ascent and descent of the elevator, and by-passing instrumentalities for rendering said timing devices inoperative and at the will of an operator substituting manual control for each thereof.

27. In an apparatus of the character described, a conveyor upon which a purchaser can place goods purchased, a counter to which said conveyor carries said purchases, a cash register being disposed at one side of and adjacent said counter, an elevator well terminating upwardly within said counter, an elevator within said well, said well being so disposed that a worker at said register may place said purchases upon a horizontal sheet adapted to form a bottom of a container to be formed, said sheet being disposed upon said elevator after it has been raised, a support for a roll of paper in strip form which is to be advanced to and about said well to form the side wall of said container, an operable brake for said support, two spaced strip-propellers positioned between said support and said well, an operable brake for said first strip-propeller, a first control for applying said brakes to said support and said first strip-propeller, a signal being provided to operate said first control and hence said brakes when a length of the strip slightly greater than the horizontal periphery of said well has passed a fracture line and when a portion of the strip relatively nearer said support is still in engagement with said first propeller, said stoppage of the main body of paper while the leading end is still propelled causing it to break at a fracture line, a guide for directing the severed end of the strip to contact with the interior surfaces of said well and about said surfaces, propelling teeth the points of which are slanted forwardly in the direction of paper advance and also upwardly, a movable support for said teeth by which they are disposed in a plane slightly below said well and thereabout and positioned to engage the lower horizontal edge of the severed leading end of the strip advanced thereto, means for rotating said support so that said teeth advance the strip about said interior surface, the width of said strip being slightly greater than the heighth of the container and such excess being disposed below the plane to which said elevator descends, thereby forming a margin, a lower guide about said wall spaced slightly inwardly therefrom engaging said margin, a corresponding guide for the upper portion of said strip carried about the edge of said elevator, said teeth engaging the strip in said margin, means for driving said propellers and rotating said teeth support, a second control for said driving means which disables said driving means after said severed section has been propelled about the interior of said wall of said well thereby forming said wall of the container, said second control being operated by said severed strip, tucking bars movable against the outside of the lower surface of the paper for removing it from said teeth and forcing it inwardly and upwardly against the bottom piece, a support for said tucker bars upon which they are pivoted for movement against the lower edge of the paper through a slight arc, motive means for moving said tucker bars through said arc, a plunger supporting said elevator and working within a cylinder, a piston on the lower end of said plunger, an operable raising valve for admitting a fluid to said piston whereby the elevator is raised, an operable lowering valve for bleeding said cylinder whereby said elevator descends by gravity, a regulating valve controlling such bleeding by which the rate of descent can be finely adjusted so that it is closely proportionate to the weight placed upon said elevator, a connection between said lowering valve and said elevator raising valve and said first and second controls for maintaining said raising valve operative and said lowering valve inoperative until said second control has applied said brakes to sever said advance strip and said second control has stopped said driving means, and timing devices associated with said elevator raising and lowering valves respectively which when operative determine the intervals between each ascent and descent of the elevator.

28. In an apparatus of the character described, a conveyor upon which a purchaser can place goods purchased, a counter to which said conveyor carries said purchases, a cash register being disposed at one side of and adjacent said counter, an elevator well terminating upwardly within said counter, an elevator within said well, said well being so disposed that a worker at said register may place said purchases upon a horizontal sheet adapted to form a bottom of a container to be formed, said sheet being disposed upon said elevator after it has been raised, a support for a roll of paper in strip form which is to be advanced to and about said well to form the side wall of said container, means for advancing the leading end of said strip to and about the interior wall of said well, said means including instrumentalities for creating slack in a predetermined portion of said strip, means for severing said strip along a fracture line when it is disposed within said slack portion of said strip, a first control for stopping the operation of said advancing means and operating said severing means, a signal being provided to operate said first control and hence said brakes when a length of the strip slightly greater than the horizontal periphery of said well has passed a fracture line and when a portion of the strip relatively nearer said support is still in engagement with said first propeller, said stoppage of the main body of paper while the leading end is still propelled causing it to break at a fracture line, a guide for directing the severed end of the strip to contact with the interior surfaces of said well and about said surfaces, propelling teeth the points of which are slanted forwardly in the direction of paper advance and also upwardly, a movable support for said teeth by which they are disposed in a plane slightly below said well and thereabout and positioned to engage the lower horizontal edge of the severed leading end of the strip advanced thereto, means for rotating said support so that said teeth advance the strip about said interior surface, the width of said strip being slightly greater than the height of the container and such excess being disposed below the plane to which said elevator descends, thereby forming a margin, a guide about said wall spaced slightly inwardly therefrom engaging said margin, a corresponding guide for the upper portion of said strip carried about the edge of said elevator, said teeth engaging the strip in said margin, means for driving said propellers and rotating said teeth support, a second control for said driving means which disables said driving means after said severed section has been propelled about the interior of said wall of said well thereby forming said wall of said container, said second control being operated by said severed strip, tucking bars movable against the outside of the lower surface of the paper for removing it from said teeth and forcing it inwardly and upwardly against the bottom piece, a support for said tucker bars upon which they are pivoted for movement against the lower edge of the paper through a slight arc, motive means for moving said tucker bars through said arc, a plunger supporting said elevator and working within a cylinder, a piston on the lower end of said plunger, an operable raising valve for admitting a fluid to said piston whereby the elevator is raised, an operable lowering valve for bleeding said cylinder whereby said elevator descends by gravity, a regulating valve controlling such bleeding by which the rate of descent can be finely adjusted so that it is closely proportionate to the weight placed upon said elevator, a connection between said lowering valve and said elevator raising valve and said first and second controls for maintaining said raising valve operative and said lowering valve inoperative until said second control has applied said brakes to sever said advance strip and said second control has stopped said driving means, and timing devices associated with said elevator raising and lowering valves respectively which when operative determine the intervals between each ascent and descent of the elevator.

29. In a packaging apparatus as for a retail store, a conveyor, a waist-high counter to which said conveyor carries purchases placed thereupon, an elevator well terminating upwardly within said counter, an elevator within said well, said elevator when in an upward position being adapted to support a bottom piece of a container to be formed thereabout and to receive said purchases, a support for a roll of paper in strip form to be advanced to and about said well to form the side wall of a container which includes said bottom piece, strip propelling means for advancing said strip between said support and to and around said well, said propelling means including a plurality of spaced advancing instrumentalities between said support and said well and engaging said strip, mechanism for operating said propelling means, a brake for said paper support and a brake for the one of said instrumentalities nearest to said support, a first control for operating said brakes, a signal being provided to operate said first control and hence said brakes when a length of the strip slightly greater than the horizontal periphery of said well has passed a fracture line and when a portion of the strip relatively nearest said support is still in engagement with said advancing instrumentality nearest to said support, said stoppage of the main body of paper while the leading end is still being advanced causing it to break at a fracture line, a guide for directing the severed end of the strip into contact with the interior surface of said well and about said surface, propelling teeth, means for moving said teeth into engagement with the strip and advancing the strip about said interior surface, means for driving said mechanism for said propelling means and said teeth moving means, means for holding said portion of said strip about said well after said teeth have propelled it thereabout, a second control for said driving means which disables said driving means after said severed section has been propelled about the interior of said wall of said well thereby forming said wall of said container, said second control being operated by said severed strip, tucking bars movable against said wall portion of said strip for removing it from said teeth and forcing it inwardly and upwardly against the bottom piece, means for raising and lowering said elevator, an operative connection between said lowering means and said raising means and said first and second controls for maintaining said raising means operative and said lowering means inoperative until said second control has applied said brakes to sever said advanced strip and said second control has stopped said driving means, and timing means associated with said elevator raising and lowering means which determine the interval between each ascent and descent of the elevator.

(References on following page)

References Cited in the file of this patent

UNITED STATES PATENTS

| | | |
|---|---|---|
| 1,481,757 | Stokes | Jan. 22, 1924 |
| 1,592,767 | House | July 13, 1926 |
| 1,761,771 | Brownell | June 3, 1930 |
| 1,901,715 | Young | Mar. 14, 1933 |
| 1,965,992 | Silvay | July 10, 1934 |
| 1,980,361 | Spear | Nov. 13, 1934 |
| 2,176,147 | Palmer | Oct. 17, 1939 |
| 2,247,069 | Sargent et al. | June 24, 1941 |
| 2,443,011 | Petskeyes | June 8, 1948 |
| 2,466,823 | Poppe | Apr. 12, 1949 |
| 2,471,017 | Wilcox | May 24, 1949 |
| 2,538,564 | Jensen et al. | Jan. 16, 1951 |
| 2,569,711 | Foster | Oct. 2, 1951 |
| 2,614,374 | Hall | Oct. 21, 1952 |
| 2,647,670 | Cox | Aug. 4, 1953 |
| 2,709,880 | Jorgensen | June 7, 1955 |
| 2,735,604 | Zerlin | Feb. 21, 1956 |
| 2,815,620 | Prodigo | Dec. 10, 1957 |